US007974600B2

(12) United States Patent  (10) Patent No.: US 7,974,600 B2
Kanada et al.  (45) Date of Patent: Jul. 5, 2011

(54) MOBILE STATION, MOBILE STATION COMMUNICATION CONTROL METHOD, BASE STATION, AND COMMUNICATION SYSTEM

(75) Inventors: Naoki Kanada, Tokyo (JP); Kakuichi Shiomi, Tokyo (JP); Atsushi Yamagishi, Kanagawa (JP)

(73) Assignees: Electronic Navigation Research Institute, Tokyo (JP); Mitsubishi Space Software Co., Ltd., Tokyo (JP)

( * ) Notice: Subject to any disclaimer, the term of this patent is extended or adjusted under 35 U.S.C. 154(b) by 224 days.

(21) Appl. No.: 10/591,353

(22) PCT Filed: Aug. 17, 2004

(86) PCT No.: PCT/JP2004/011769
§ 371 (c)(1),
(2), (4) Date: Dec. 27, 2006

(87) PCT Pub. No.: WO2005/086517
PCT Pub. Date: Sep. 15, 2005

(65) Prior Publication Data
US 2007/0197208 A1 Aug. 23, 2007

(30) Foreign Application Priority Data
Mar. 3, 2004 (JP) .................. 2004-058856

(51) Int. Cl.
*H04Q 7/20* (2006.01)
(52) U.S. Cl. ............... 455/404.1; 455/452.1; 455/512
(58) Field of Classification Search .......... 455/403, 455/404.1, 404.2, 567
See application file for complete search history.

(56) References Cited

U.S. PATENT DOCUMENTS 3,986,119 A   10/1976 Hemmer, Jr. et al.
4,513,413 A * 4/1985 Gorman et al. ............... 370/295

(Continued)

FOREIGN PATENT DOCUMENTS

JP   50-99403 A   8/1975

(Continued)

OTHER PUBLICATIONS

Kohji Takeo, "A Study of CDMA Macro/Micro Cellular System," The Institute of Electronics, Information and Communication Engineers, Sogo Taikai Koen Ronbunshu Tsushin 1, Mar. 11, 1996, p. 397.

(Continued)

*Primary Examiner* — Nick Corsaro
*Assistant Examiner* — Joseph Dean, Jr.
(74) *Attorney, Agent, or Firm* — Birch, Stewart, Kolasch & Birch, LLP

(57) ABSTRACT

It aims at preferentially dealing with emergency communication etc. by a simple and effective method when emergency communication etc. is initiated. In emergency situation, at a mobile station 200, a special call part 206 is switched from a normal mode to an emergency mode, and a mobile station side communication part 206 transmits a radio wave with a transmitted signal of high power (power spectrum density) at the center frequency $f_0$ of a carrier wave. A base station 100 receives the radio wave with the transmitted signal of high power (power spectrum density) at the center frequency $f_0$ of the carrier wave, from the mobile station 200 which output communication for emergency situation. The base station 100 outputs suppression signals for suppressing signal intensity to the other mobile stations. Only the mobile station 200 which transmitted the communication for emergency situation establishes a channel to the base station 100.

13 Claims, 17 Drawing Sheets

<IN THE CASE OF MOBILE STATION 200a SENDING EMERGENCY COMMUNICATION>

U.S. PATENT DOCUMENTS

| | | | |
|---|---|---|---|
| 4,901,307 A | | 2/1990 | Gilhousen et al. |
| 4,953,178 A | * | 8/1990 | Ishigaki ................. 375/141 |
| 5,654,979 A | * | 8/1997 | Levin et al. |
| 5,678,188 A | | 10/1997 | Hisamura |
| 5,742,666 A | | 4/1998 | Alpert |
| 5,926,133 A | * | 7/1999 | Green, Jr. ................. 342/363 |
| 5,930,684 A | * | 7/1999 | Keskitalo et al. ........... 455/69 |
| 6,078,572 A | | 6/2000 | Tanno et al. |
| 6,128,512 A | | 10/2000 | Trompower et al. |
| 6,298,050 B1 | * | 10/2001 | van Heeswyk et al. ....... 370/335 |
| 6,421,009 B2 | | 7/2002 | Suprunov |
| 6,826,394 B1 | * | 11/2004 | Raith et al. ............. 455/404.2 |
| 7,065,383 B1 | | 6/2006 | Hovers et al. |
| 2001/0026542 A1 | * | 10/2001 | Kusaka et al. ............. 370/331 |
| 2001/0050926 A1 | * | 12/2001 | Kumar ..................... 370/529 |
| 2003/0003901 A1 | | 1/2003 | Kuroiwa |
| 2003/0073424 A1 | | 4/2003 | Nunally |
| 2003/0161411 A1 | * | 8/2003 | McCorkle et al. .......... 375/295 |
| 2005/0100082 A1 | * | 5/2005 | Ma ........................ 375/148 |

FOREIGN PATENT DOCUMENTS

| | | |
|---|---|---|
| JP | 63-108827 A | 5/1988 |
| JP | 02-009238 A | 1/1990 |
| JP | 08-289367 A | 11/1996 |
| JP | 9-233051 A | 9/1997 |
| JP | 2000-059845 A | 2/2000 |
| JP | 2001-143182 A | 5/2001 |
| JP | 2002-502143 A | 1/2002 |
| WO | WO-91/07037 A1 | 5/1991 |
| WO | WO-92/21196 A1 | 11/1992 |
| WO | WO-94119876 A1 | 9/1994 |
| WO | WO-99/38270 A2 | 7/1999 |
| WO | WO-00/36763 | 6/2000 |
| WO | WO-00/40992 A1 | 7/2000 |
| WO | WO-2004/110090 A1 | 12/2004 |

OTHER PUBLICATIONS

N Kanada et al , "4 Efficient Emergency Communication Method using CDMA Systems," Research Meeting of Electronic Navigation Research Institute (Third Time, Jun. 2003) , Jun. 5, 2003, pp. 15-18.
N Kanada et al , "Efficient Emergency Communication Method using CDMA Systems," Japan Radio Air Navigation Systems Association, 2003 Autumn Issue No. 37, Sep. 10, 2003, pp. 51-57.
N. Kanada et al, "Efficient Preemption Method on CDMA Systems," The 3rd NexSAT Steering Group. Oct. 30, 2003.

* cited by examiner

<AT NORMAL COMMUNICATION>

<IN THE CASE OF MOBILE STATION 200a SENDING EMERGENCY COMMUNICATION>

<BASE STATION COVERING A PLURALITY OF MOBILE STATIONS>

<VORONOI DIAGRAM WHERE $P_0, \ldots, P_5$ ARE GENERATRICES>

<SENDING PROCEDURE OF EMERGENCY
COMMUNICATION ETC. BY INTERFERENCE>

MOBILE STATION, MOBILE STATION COMMUNICATION CONTROL METHOD, BASE STATION, AND COMMUNICATION SYSTEM

TECHNICAL FIELD

The present invention relates to a communication control method and a communication system of a base station and a mobile station in a communication system. More specifically, it relates to a communication control method in CDMA communication system which is suitable for communication for emergency situation when compared with normal communication, and to a communication system including a base station and mobile stations.

BACKGROUND ART

The near-far problem is always a problem in CDMA (Code Division Multiple Access) system. If mobile stations transmit at the same power, the radio wave from mobile stations far from a base station is weak at the base station and the radio wave from mobile stations near the base station is strong at the base station, which causes the problem.

This has not been a problem in the Frequency Division Multiple Access (hereafter described as FDMA) and the Time Division Multiple Access (hereafter described as TDMA) being conventional multiplexing communication systems.

In FDMA, each mobile station uses a different frequency. Therefore, even if strength of the radio wave from a far mobile station and strength of the radio wave from a close-by mobile station are different, the base station is able to distinguish them according to frequencies.

In TDMA, each mobile station uses a different time slot. Therefore, the radio wave from a far mobile station and the radio wave from a close-by mobile station do not simultaneously come to the base station. Accordingly, even if strength of the radio wave from the distant mobile station and strength of the radio wave from the close-by mobile station are different, the base station is able to distinguish them according to time slots.

On the other hand, in CDMA system, the base station simultaneously communicates with a plurality of mobile stations using the same frequency and different codes. Then, if the radio wave from a distant mobile station and the radio wave from a close-by mobile station come simultaneously at the same frequency, the radio wave from the distant mobile station will be drowned out by the radio wave of the close-by mobile station. This is an outline of the problem called the near-far problem.

To avoid the near-far problem, the following two methods are currently known.

One is the method of using an artificial satellite as a base station and stations on the earth (the airspace also included) as mobile stations. In this case, as to all the mobile stations, the ratio of the distance between the mobile station and the base station is approximately constant. Therefore, even when CDMA system is used for communication, the near-far problem does not occur. This method is used in GPS (Global Positioning System).

The other is the method in which mobile stations control their power by performing communication between the mobile stations and the base station and configuring feedback loops so that the field strength from each mobile station at the base station may become approximately constant. This is called power control. As to the power control, there are two type methods; open loop control and closed loop control.

These methods are used by a cellular system such as a cellular phone, and are patents of Qualcomm Incorporated (in USA) (for example, refer to the Patent Document 1, the Patent Document 2, and the Patent Document 3).

Patent Document 1: International Publication WO 91/07037
Patent Document 2: International Publication WO 92/21196
Patent Document 3: International Publication WO 94/19876

DISCLOSURE OF THE INVENTION

Problems to be Solved by the Invention

Conventionally, emergency communication etc. has been performed as follows: The emergency communication etc. herein indicates one of distress communication, emergency communication, safety communication, and extraordinary communication defined by the Radio Law.

In FDMA, specific frequencies are defined to be emergency communication frequencies, and one is obliged to always monitor the emergency communication frequencies (Article 65 of the Radio Law).

However, according to this method, it is prohibited to use the emergency communication frequency when emergency communication etc. is not performed. That is, it is impossible to affirm that all the frequencies are being utilized for communication.

Similarly, in TDMA, specific time slots are defined to be time slots for emergency and it is not allowed to use the time slots for emergency except in time of emergency. Thus, it is possible to perform emergency communication etc.

However, according to this method, it is prohibited to use the time slots for emergency when emergency communication etc. is not performed. That is, it is impossible to affirm that all the time is utilized for communication.

Similarly, in the case of CDMA, specific codes are defined to be codes for emergency and it is not allowed to use the codes for emergency except in time of emergency. Thus, it is possible to perform emergency communication etc. However, according to this method, it is prohibited to use the code for emergency when emergency communication etc. is not performed. That is, it is impossible to affirm that all the codes are utilized for communication.

As stated above, the problem common to the conventional methods is that an emergency communication frequency in the case of FDMA, a time slot for emergency in the case of TDMA, and a code for emergency in the case of CDMA are reserved for emergency communication. In other words, a part of channel capacity that is assigned as a radio wave, which is limited resource, is always reserved for emergency communication etc. seldom used. Such emergency communication is hereafter called the emergency communication of the channel capacity reservation type.

In the emergency communication of the channel capacity reservation type, partial channel capacity is reserved only for the time of performing emergency communication etc. rarely performed. Therefore, it is impossible to utilize all the channel capacity for normal communication, which is inefficient in the respect of effective use of a radio wave, which is limited resource.

Furthermore, in the case of FDMA, it is necessary to always monitor the emergency communication frequency on which a call rarely exists, as different one from normal communication. This gives a large burden to a person who operates it.

The present invention aims at preferentially dealing with communication for emergency situation by a simple and effective method when emergency communication etc. is sent. A method of preferentially dealing with communication for emergency situation by a simple and effective method, especially in the case of using CDMA system for communication, is proposed.

Means To Solve the Problems

According to the present invention, a mobile station which communicates with a base station by using direct sequence system comprises:

a special call part to request to initiate a special call; and a mobile station side transmission part, in response to a request from the special call part, to generate a special radio wave signal of high power spectrum density and transmit it to the base station.

The mobile station comprises a spread modulation part to perform spread modulation of an information signal, wherein the mobile station side transmission part generates the special radio wave signal of high power spectrum density by passing the spread modulation part.

The mobile station side transmission part includes a special code generation part to generate a special code of a direct-current component, and a spread modulation part to perform spread modulation of an information signal by using the special code generated by the special code generation part, and generates the special radio wave signal of high power spectrum density by performing spread modulation of the information signal by using the special code of the direct-current component.

The mobile station further includes a communication control part to restrict a bit rate of the information signal to be low when the mobile station side transmission part generates the special radio wave signal, in order to increase power spectrum density of the special radio wave signal by restricting the bit rate to be low.

The mobile station side transmission part performs communication by using the special radio wave signal until a session with the base station is established.

The mobile station side transmission part generates the special radio wave signal of same power as power used in the direct sequence system, and of a narrower band than a band used in the direct sequence system.

According to the present invention, a communication control method for a mobile station side to communicate with a base station by using direct sequence system comprises:

requesting to initiate a special call; and in response to the requesting to initiate the special call, generating a special radio wave signal of high power spectrum density and transmitting it to the base station.

According to the present invention, a base station which communicates with a plurality of mobile stations by using direct sequence system comprises:

a base station side reception part to receive a special radio wave signal of high power spectrum density from the plurality of mobile stations;

a detection part to detect whether the base station side reception part received the special radio wave signal; and a base station side transmission part to transmit an assignment signal for assigning a channel to a mobile station which had transmitted the special radio wave signal detected by the detection part.

The base station side reception part includes a special signal reception part to receive the special radio wave signal to acquire an information signal without performing spread demodulation.

The base station side reception part includes a special signal reception part to receive the special radio wave signal and to acquire an information signal by performing spread demodulation of the special radio wave signal by using a special code of a direct-current component.

According to the present invention, a communication system where a base station and a plurality of mobile stations communicate using direct sequence system comprises:

the plurality of mobile stations, each including a special call part to request to initiate a special call, and a mobile station side transmission part, in response to a request from the special call part, to generate a special radio wave signal of high power spectrum density and transmit it to the base station; and the base station including a base station side reception part to receive the special radio wave signal of high power spectrum density from the plurality of mobile stations, a detection part to detect whether the base station side reception part received the special radio wave signal, and a base station side transmission part to transmit an assignment signal for assigning a channel to a mobile station which had transmitted the special radio wave signal detected by the detection part.

According to the present invention, a communication control program, having computer executable processing, for a mobile station side to communicate with a base station by using direct sequence system comprises:

processing of requesting to initiate a special call; and in response to the requesting to initiate the special call, processing of generating a special radio wave signal of high power spectrum density and transmitting it to the base station.

According to the present invention, a communication control program, having computer executable processing, for a base station side to communicate with a plurality of mobile stations by using direct sequence system comprises:

processing of receiving a special radio wave signal of high power spectrum density from the plurality of mobile stations;

processing of detecting whether the special radio wave signal was received; and processing of transmitting an assignment signal for assigning a channel to a mobile station which had transmitted the special radio wave signal detected.

Effects of the Invention

According to the present invention, as it is unnecessary to always reserve a part of channel capacity for emergency communication etc., the channel resource that no longer needs to be reserved can be effectively used.

PREFERRED EMBODIMENTS FOR CARRYING OUT THE INVENTION

Embodiments 1 to 4 stated below have the same contents as Japanese Patent Application No. 2003-157645 previously filed by the applicants of the present invention. The invention according to the present application is mainly based on the contents of Embodiments described in and after Embodiment 5.

The reason for Embodiments 1 to 4 described below having the same contents as Japanese Patent Application No. 2003-157645 is that Embodiments 1 to 4 are bases and premises of the contents of the Embodiments described in and after Embodiment 5 and help them to be understood.

Although the contents of Embodiments 1 to 4 stated below are the same as those of Japanese Patent Application No. 2003-157645 previously filed by the applicants of the present invention, Japanese Patent Application No. 2003-157645 has not been published yet at the time of filing the present application, and inventions based on the contents of Embodiments 1 to 4 are included in the present application. Moreover, inventions combining the contents of Embodiments 1 to 4 and the contents of in and after Embodiment 5 are also included.

CDMA is an acronym of Code Division Multiple Access, and is one type of multiple access methods. As concepts corresponding to CDMA, there are FDMA (Frequency Division Multiple Access) and TDMA (Time Division Multiple Access). FDMA enables simultaneous communication by many radio stations, by dividing frequency into channels. TDMA enables simultaneous communication by many radio stations, by dividing time into slots. Similarly, CDMA is a technology which enables simultaneous communication by many radio stations, by superimposing data with codes.

CDMA is a system which transmits information with codes having low correlation by utilizing spread spectrum.

Spectrum means a waveform of a carrier wave carrying information (transmitted data), seen from a frequency axis. Spread spectrum communication system is a communication system in which a bandwidth of a spectrum of a carrier (a carrier wave) carrying a baseband signal [an information signal not modulated (a digital signal of transmitted data)] output from a computer etc. is extended (spread) up to several times to several tens of times its original frequency bandwidth being a narrow band, for performing transmission.

Since CDMA communication is essentially communication based on code division, it is supposed that the communication by CDMA performs communication using digital signals.

Hereafter, CDMA means direct sequence system (Direct Sequence CDMA) if not otherwise mentioned. If it is necessary to especially distinguish between Frequency Hopping and Direct Sequence, it will be described as FH-CDMA and DS-CDMA.

The direct sequence system herein is a system in which a bandwidth of a carrier carrying a baseband signal is directly spread and thus extended to be a large frequency band, and is a method that signal data is multiplied by a spreading code having a certain bandwidth so that a frequency band of a sequence of the data is extended, and is modulated to be transmitted. The frequency hopping system is a system in which a frequency of a carrier carrying a baseband signal is consecutively changed (made to hop) within a certain range, to present as if a wide frequency band is being used, and a system which transmits data with changing a channel at short time intervals (for example, about 0.1 seconds) although the frequency bandwidth used per channel is narrow.

CDMA has an advantage that a plurality of users are able to share the same frequency band. In CDMA, a spreading code peculiar to a user communication channel is used for distinguishing a user.

In the transmission side, a band (a spectrum) of a transmission frequency is extended by multiplying voice data by a spreading code whose clock frequency has a frequency bandwidth of several tens or more of that of the voice data. That is, spread spectrum is performed. In the reception side, the bandwidth returns with multiplication by the same spreading code as that used at the transmission, and demodulation can be performed.

In the communication system according to Embodiments explained below, the case of applying the present invention to an aviation field will be described as an example.

In this case, a ground station which communicates with aircraft and a satellite station which communicates with aircraft are called base stations, and an aircraft which communicates with a base station is called a mobile station.

Moreover, suppose that a channel using CDMA system is established between mobile stations and a base station. The base station corresponds to a traffic controller, the mobile stations correspond to pilots, and others are equivalent to the conventional structure.

Further, in the communication system according to Embodiments explained below, suppose that CDMA system is used and it is in a state of no near-far problem, namely power control being performed or the base station being a satellite.

In all the Embodiments explained below, communication for emergency situation indicates distress communication, emergency communication, safety communication, and extraordinary communication.

The distress communication indicates a method of preceding a distress signal at the time when a ship or an aircraft is in grave and imminent danger.

The emergency communication indicates a method of preceding an emergency signal at the time when a ship or an aircraft has a possibility of lapsing into grave and imminent danger or other emergency matter occurs.

The safety communication indicates a method of preceding a safety signal for the purpose of preventing grave danger against navigation of a ship or an aircraft.

The extraordinary communication indicates radio communication performed for rescuing a human life, relieving at a disaster, reserving transportation and telecommunication, or retaining order when it is impossible or remarkably difficult to utilize wired communication, where an earthquake, a typhoon, a flood, a tidal wave, snow damage, a conflagration, a riot or any other emergencies occurred or anticipated to occur.

Normal communication indicates communication other than the communication for emergency situation.

Embodiment 1

Embodiment 1 will be explained hereafter.

FIG. 1 illustrates normal communication of the base station 100 and a mobile station 200 structuring the communication system according to Embodiment 1.

The state is considered that the base station 100 communicates with n mobile stations (n is a natural number, which is 2 or greater than 2): a mobile station 200a, a mobile station 200b, a mobile station 200c, . . . , and a mobile station 200n. Normally, as shown in FIG. 1, all the mobile stations 200 perform normal communication with the base station 100.

Next, a method of the mobile station 200a's performing communication for emergency situation will be described.

FIG. 2 illustrates a communication state when the mobile station 200a sends communication for emergency situation.

The mobile station 200a temporarily increases field strength of a signal to be sent to the base station 100 from the mobile station 200a. This can be realized by a method, for example, in which the mobile station 200a temporarily increases output, or changes a gain of an antenna by using an array antenna and such. At this time, it is supposed that the base station 100 continues to output a signal which controls all the mobile stations 200 to maintain the output level having been kept.

According to a feature of CDMA system which is known as the near-far problem, when field strength from only a certain mobile station becomes strong, it becomes impossible for the base station to decode radio waves from the other mobile stations. In the present case, when the radio wave from the mobile station 200a at the base station 100 becomes sufficiently strong compared with radio waves from the other mobile stations, it becomes impossible for the base station 100 to decode radio waves of the mobile station 200b, . . . , the mobile station 200n.

Thus, the mobile station 200a submerges communication between the base station 100 and the other mobile stations 200b, . . . , 200n by increasing the field strength of a call signal until a communication signal between the mobile station 200a and the base station 100 becomes to have the field strength strong enough to be decoded, in order to establish an exclusive channel which can use all the channel capacity for the base station 100. Note that, when the mobile station is in the coverage area of the base station, since a radio wave from the base station reaches the mobile station, output control at the base station side is unnecessary.

Next, an internal configuration of the base station 100 and the mobile station 200 which compose the communication system of the present Embodiment will be explained in reference to FIG. 3.

The mobile station 200 utilizing CDMA needs an output control part 202 which has a function of normal power control, i.e., controlling field strength of a signal for performing normal communication, and a function of temporarily increasing an output, with ignoring the normal power control, by switching from the normal function to the emergency one. In addition, the mobile station 200 includes a communication control part 204 which controls normal communication, an emergency communication call part 206 which requests the output control part 202 to initiate a call of communication for emergency situation in time of emergency, a mobile station side transmission part 208 which transmits a signal for radio communication with the base station 100, and a mobile station side reception part 210 which receives a signal for radio communication with the base station 100.

On the other hand, the base station 100 includes an output control part 102 which controls field strength of a signal used for radio communication with the mobile station 200, a base station side transmission part 110 which transmits a signal for radio communication with the mobile station 200, a base station side reception part 108 which receives a signal for radio communication with the mobile station 200, a detection part 106 which detects a call signal of communication for emergency situation from the received signal based on the field strength of the signal received by the base station side reception part 108, and a communication control part 104 which controls normal communication.

Next, operations of the present communication system will be explained.

The mobile station 200a sends communication for emergency situation to the base station 100 as follows:

(1) Corresponding to a call request of communication for emergency situation sent from the emergency communication call part 206 in time of emergency, the output control part 202 switches the output adjustment of field strength from the normal mode to the emergency mode, submerges communication between the other mobile stations and the base station 100, and increases the field strength used for the communication for emergency situation until the field strength of the communication signal in time of emergency between the mobile station concerned and the base station 100 becomes strong enough to be decoded.

(2) The mobile station side transmission part 208 sends a call signal of the communication for emergency situation to the base station 100, at the field strength controlled by the output control part 202.

(3) The base station side reception part 108 receives a strong radio wave from the mobile station 200a which sent the communication for emergency situation.

(4) The detection part 106 detects the call signal of the communication for emergency situation in the received signal, based on the field strength of the signal received by the base station side reception part 108, and the base station side transmission part 110 continues to output suppression signals to all the mobile stations for suppressing their field strength. At this time, the base station side transmission part 110 sends signals to all the mobile stations, as the suppression signals of the field strength, which direct reduction of the field strength, keeping of the present condition of the field strength (determent of the rise of the field strength), or physical disconnection of the normal communication with the other mobile stations.

(5) The mobile station 200a ignores this suppression signal of the field strength, and since the other mobile stations are suppressed by the near-far effect, it becomes impossible for the base station 100 to receive communication except for the communication for emergency situation sent from the mobile station 200a.

(6) The base station side transmission part 110 transmits an assignment signal for assigning a channel for emergency situation to the mobile station 200a which sent the communication for emergency situation detected by the detection part 106, and only the mobile station 200a which sent the communication for emergency situation establishes a channel to the base station 100.

The base station side transmission part 110 is able to assign all or a part of assignable channels to the mobile station 200a. When the base station side transmission part 110 assigns all of the assignable channels to the mobile station 200a, the mobile station 200a is able to quickly perform the communication for emergency situation by using all of the channels. When the base station side transmission part 110 assigns a part of the channels to the mobile station 200a, the communication for emergency situation with the mobile station 200a can be reserved while retaining the normal communication of the other mobile stations using channels to the base station 100.

(7) After establishing the channel for emergency situation to the base station 100, the output control part 202 of the mobile station 200a suppresses the field strength to be normal field strength, and performs the communication for emergency situation with the base station according to the normal communication procedure.

However, it is also acceptable for the output control part 202 to continue to retain the field strength strong enough to establish the communication for emergency situation, with submerging the communication between the other mobile stations and the base station 100, until the communication for emergency situation with the base station 100 is completed.

Next, in addition to the above communication procedure, the case of requesting a code allocation with initiating a call of communication for emergency situation will be explained in reference to FIG. 4.

FIG. 4 shows a communication procedure under the assumption of the case of the mobile station 200a sending communication for emergency situation. The bold lines in FIG. 4 indicate that transmission is performed in time of emergency by using a stronger output (field strength) than a normal one.

First, corresponding to a call request of communication for emergency situation sent from the emergency communication call part 206 in time of emergency, the output control part 202 switches the output adjustment of field strength from the normal mode to the emergency mode, submerges communication between the other mobile stations and the base station 100, and increases the field strength used for the communication for emergency situation until the field strength of the communication signal in time of emergency between the mobile station concerned and the base station 100 becomes strong enough to be decoded (S1).

The mobile station side transmission part 208 transmits a code allocation request signal together with the call signal of the communication for emergency situation, at the field strength controlled by the output control part 202 (S2). The code allocation request signal is an example of identification information indicating to be communication for emergency situation. Therefore, as long as the code allocation request signal can inform the base station 100 of being in time of emergency, it may have any information.

The base station side reception part 108 receives a strong radio wave from the mobile station 200*a* which sent the communication for emergency situation (S3).

The detection part 106 detects the call signal of the communication for emergency situation in the received signal, based on the field strength of the signal received by the base station side reception part 108, and the base station side transmission part 110 continues to output suppression signals for suppressing field strength to the other mobile stations (S4).

As the other mobile stations are suppressed by the near-far effect, it becomes impossible for the base station 100 to receive communication except for the communication for emergency situation sent from the mobile station 200*a* (S5).

The base station side transmission part 110 transmits an assignment signal (code allocation) for assigning a channel for emergency situation to the mobile station 200*a* which sent the communication for emergency situation detected by the detection part 106, and only the mobile station 200*a* which sent the communication for emergency situation establishes a channel to the base station 100 (S6).

The mobile station side transmission part 208 transmits an acknowledgement signal (Ack) over the code allocation, to the base station 100 (S7).

Then, it returns to the normal power-controlled state (field strength in normal time), which can minimize the interference to the communication of the other mobile stations. Moreover, by this method, it is possible to prepare for the case of other mobile station's sending communication for emergency situation.

In this system, the communication is finally performed according to the normal communication procedure (S8). That is, the field strength of the mobile station 200*a*, which sent the communication for emergency situation, finally becomes the same as the one power-controlled by the normal communication.

For this purpose, when a channel is established, a negotiation will be performed between the mobile station 200*a* and the base station 100, and the mobile station 200*a* will reserve only a necessary band (code) to perform communication for emergency situation. However, as mentioned above, it is also acceptable for the mobile station 200*a* to reserve all the bands (codes) for the communication for emergency situation.

In the case of an aircraft or a ship sending distress communication, the antenna power does not necessarily need to be in the range described in the radio station license. When a ship or an aircraft performs distress communication, the installation place of radio equipment, the identification code, the type of a radio wave, a frequency, operation time, and an antenna power do not need to comply with what is described in the license. That is, it is possible to perform transmission at the maximum output technically possible which exceeds the output permitted by the license. Even if the transmission is performed at the technically possible maximum output, the Radio Law (Articles 52, 53, 54, 55, 56, 66, 67, 68, 80, and 106) is not infringed.

Therefore, in the case of emergency of an aircraft or a ship, when the emergency communication call part 206 requests a call of distress communication as a call of communication for emergency situation, the output control part 202 performs transmission, corresponding to the request of the emergency communication call part 206, at a sufficiently large output (depending upon a reception part and a modulation system to be used, and a required error occurrence rate) of the field strength used for communication with the base station 100. Accordingly, it becomes possible to suppress radio waves from the other mobile stations (which perform transmission at the antenna power described in the radio station license). That is, the output control part 202 is able to perform transmission with setting the field strength output to the maximum of self-ability However, this method intentionally blocks operations of other radio stations. Therefore, when the emergency communication call part 206 requests a call of at least one of emergency communication, safety communication, or extraordinary communication, as a call of communication for emergency situation, the output control part 202 needs to control the field strength used for communication with the base station 100 as follows, corresponding to the request of the emergency communication call part 206. That is, the output control part 202 needs to control the field strength used for communication with the base station 100 to be antenna power in the range not against laws, such as the Radio Law, and field strength of establishing the communication for emergency situation with submerging communication between other mobile stations and the base station. In the case of performing communication at excessive antenna power for uses other than distress communication in Japan, it is punished under Article 56 of the Radio Law.

The radio communication method and its communication system which performs distress communication, emergency communication, safety communication, extraordinary communication (communication for emergency situation), normal communication and so on, by using a code division multiple access (CDMA) system has been explained above. Features of the radio communication method and its communication system are as follows: being composed of the base station 100 and two or more mobile stations 200 for performing radio communication, including a transmission/reception part which enables to communicate at field strength larger than that of the other mobile stations performing normal communication in the case of the base station 100 and the mobile stations 200 performing communication other than the normal communication, and giving priority to the communication with the mobile station performing communication for emergency situation by submerging communication of the mobile station 200 which performs normal communication with the base station 100 in radio waves of emergency communication etc.

Moreover, has been explained the radio communication method and its system which includes the first step in which the mobile station 200 measures the field strength from the base station 100 and calculates proper transmission power corresponding to a distance from the base station 100 at the normal communication, includes the means at a strong level exceeding the transmission power calculated in the first step, and includes the means in the mobile station side to control communication at transmission power larger than the transmission level at the normal communication.

According to the invention of the present Embodiment, firstly, it is unnecessary to always reserve a part of channel capacity for emergency communication etc., which is unlike the emergency communication of the channel capacity reservation type. This greatly contributes to effective use of frequency being a global subject.

Moreover, as to the channel exclusively established by this method, the whole capacity of the channel can be exclusively used by one station.

Explaining more precisely, since the mobile station that sends emergency communication etc. can freely select a code, the mobile station can arbitrarily set up a channel capacity. Such feature that the channel capacity can be arbitrarily set up is peculiar to the CDMA system, and large-scale equipment is needed for realizing the same system in the TDMA system or the FDMA system.

Furthermore, the base station is released from the duty of listening to emergency communication frequency, which is an indispensable duty in FDMA.

Embodiment 2

In the present Embodiment, the situation that communication for emergency situation may be called from two or more mobile stations 200 will be considered. FIG. 5 shows a whole structure of a communication system where a plurality of mobile stations initiate calls of communication for emergency situation.

For the communication for emergency situation sent from the first mobile station 200a, a channel is established like the above stated.

For the communication for emergency situation sent from the second mobile station 200n, the following procedures are added according to the present Embodiment.

In the case the mobile station 200n fails in reserving an exclusive channel to the base station 100a, it tries to reserve an exclusive channel to the base station 100a as an example stated above at certain time intervals (time intervals are determined at random) until it reserves the exclusive channel to the base station.

At the time of the first mobile station 200a reserving a channel and performing a negotiation (establishment of a channel for emergency situation), the first mobile station 200a reduces the output (field strength).

The mobile station side transmission part 208 of the second mobile station 200n continues to transmit a call signal of communication for emergency situation to the base station 100 at the field strength controlled by the output control part 202 until a channel for emergency situation to the base station 100a is established. Therefore, after the first mobile station 200a reduces the field strength, the mobile station side transmission part 208 of the second mobile station 200n can reserve the channel to the base station 100a. At this time, it should be noticed that distribution of the channel capacity (in the case of CDMA, determination of a code) may be concerned by the base station.

In addition, it is also possible for the base station 100a to accept the emergency call signal from the second mobile station 200n, sent during the communication for emergency situation between the first mobile station 200a and the base station 100a, while the first mobile station 200a and the base station 100 perform communication for emergency situation.

In this case, since the time period in which the communication for emergency situation with the first mobile station 200a is broken by the emergency call signal from the second mobile station 200n is at most about 100 milliseconds, it does not cause a large trouble to the communication between the first mobile station 200a and the base station.

Thus, it becomes possible for the base station 100a to perform communication for emergency situation with the first mobile station 200a and communication for emergency situation with the second mobile station 200n in parallel, by accepting the emergency call signal of the second mobile station 200n during the communication with the first mobile station 200a.

Moreover, in the cellular system, if coverage areas of base stations are divided not to overlap, the problem in the case of many base stations existing can be reduced to the case of only one base station. In this case, the shape of a cell can be other than Voronoi Division being the optimal shape.

Voronoi Division is a division composed of line segments of perpendicular bisectors for adjacent Pi and Pj's, for {Pi} being a set of Pi, where i is a natural number and Pi is a point indicating the base station 100 in this case. The polygon made by this division is called a Voronoi polygon and the diagram showing the whole division is called a Voronoi diagram. FIG. 6 shows an example of the Voronoi diagram where P0, ..., P5 are generatrices.

In the cellular system, as mentioned above, the method for communication for emergency situation described in each Embodiment for the mobile station 200a and the mobile station 200b which communicate with the base station P0 can be established in connection with a base station P4 even when the mobile station 200a and the mobile station 200b move to the base station P4 as shown in FIG. 6. That is, the communication for emergency situation between the base station P0 and a mobile station in the cell of the base station P0 and the communication for emergency situation between the base station P4 and a mobile station in the cell of the base station P4 are independent of each other.

Therefore, the method in which the base station 100a establishes a channel for emergency situation shown in FIG. 5 can also be established by the base station 100b in the same way. The base station 100a and the base station 100b are controlled by a central control system 400.

As stated above, have been explained in the present Embodiment the radio communication method and its system which include means to transmit a request code (a code allocation request) from the mobile station 200 in time of emergency, not the time of normal communication, with initiating a call of communication for emergency situation, to transmit a power control bit (a suppression signal of field strength) from the base station 100 by inserting the power control bit into the communication channel, and to control transmission power of other mobile stations.

Moreover, have been explained the radio communication method and its system which include means to control transmission power of normal communication and emergency communication etc., with the mobile station 200's checking establishment or failure of an emergency channel etc., and enable a plurality of mobile stations in the same base station to perform emergency communication by initiating a call of emergency communication etc. at a certain fixed interval until the emergency channel etc. is established.

According to the present Embodiment, since a flag (a request code) indicating to be emergency is transmitted to the base station 100 with a call of communication for emergency situation, the base station 100 can clearly recognize a request of communication for emergency situation.

Moreover, according to the present Embodiment, in the case of the radio network made by the cellular system, since the influence of emergency communication etc. is not exerted on the cell which is far from the station performing emergency communication etc., it is possible to greatly contribute to effective use of frequency.

Embodiment 3

In the above Embodiments, the method in which the mobile station 200a performs communication for emergency situation with the base station 100 by displacing the communication with other mobile stations by temporarily increasing the output has been described.

In the present Embodiment, this method is applied to the calling of normal communication. The core of the idea is to make the output of the mobile station performing normal communication lower than the conventional one, not to make the output of the mobile station 200 performing the communication for emergency situation larger than the conventional one.

The case that two or more mobile stations 200 exist in the coverage area of one base station 100 will be considered. As mentioned above, it can be thought that even if the number of the base stations increases, it is reduced to the case of one base station because the space can be divided into coverage areas (cellular system). That is, one base station system can be assumed without loss of generality.

The size of a coverage area covered by one base station 100 is set to be smaller than that of the normal system. Then, in performing communication between the base station 100 and the mobile station 200, it is enough to transmit at power (field strength) smaller than that of the normal system. Concretely, normal communication is performed with 1/n (n is a ratio of power required for performing suppression using the near-far problem) of the maximum power of the mobile station side used in the normal system, as the maximum power allowed for the mobile station.

When the mobile station 200 establishes communication with the base station 100, transmission is performed at the maximum power equivalent to that of the normal system. At this time, suppose that the base station 100 continues to output suppression signals to all the mobile stations 200 for suppressing their outputs.

By doing this, an exclusive channel to the base station 100 can be established, with temporarily suppressing communication of the other mobile stations like a previous example.

Such establishment of an exclusive channel is utilized for initiating a call to the base station from the mobile station 200.

When performing this call, though channels temporarily become suspended, after the mobile station having performed the call returns to a normal output (normal field strength), the other mobile stations can return to the normal communication. If this communication is data communication of a packet system, even when the communication temporarily becomes suspended, the communication can be performed like that of before the call, after the channels have recovered. Then, the temporal suspension of the communication does not become a large problem.

Moreover, although a short-time (normally about 100 milliseconds) disconnection occurs in the communication with a circuit switching system, such as a telephone, if the disconnection time is short, one would not be greatly annoyed while on the telephone and can practically use it without any problem.

According to the present Embodiment, a call can be performed by the above-mentioned procedure without using a control channel. The control channel is a special channel which is not used for communication. Since communication can be performed without using the control channel (a power control signal can be superimposed on normal communication), it is possible to use all the assigned frequencies for the communication. Therefore, the band (channel capacity) having been used as a control channel can be used for normal communication. Consequently, it becomes possible to greatly contribute to the effective use of the frequency.

Moreover, according to the present Embodiment, because the field strength of the mobile station performing normal communication is made to be lower than the conventional one whereas the field strength of the mobile station 200 performing communication for emergency situation is not made to be larger than the conventional one, the amount of power required for the whole communication system can be reduced.

Furthermore, according to the present Embodiment, it can also be applied to emergency communication, safety communication, and extraordinary communication, in addition to distress communication.

Embodiment 4

In the present Embodiment, will be explained the communication method in which a mobile station to send a signal of communication for emergency situation firstly sends a noise in order to interfere with the normal communication between other mobile stations and the base station, and then stops a noise to send information on the communication for emergency situation.

The case that two or more mobile stations 200 exist in the coverage area of one base station 100 will be considered. As mentioned above, it can be thought that even if the number of the base stations 100 increases, it is reduced to the case of one base station because the space can be divided into coverage areas (cellular system). That is, also in the present Embodiment, one base station system can be assumed without loss of generality.

Suppose that the base station 100 communicates with n mobile stations (n is a natural number, which is 2 or greater than 2): a mobile station 200a, a mobile station 200b, . . . , and a mobile station 200c. Normally, as shown in FIG. 1, all the mobile stations 200 perform normal communication with the base station.

A method of the mobile station 200a's performing communication for emergency situation in this case will be explained in reference to FIG. 7.

FIG. 7 shows a sending procedure of the communication for emergency situation by interfering according to the present Embodiment.

First, at the mobile station 200a side, corresponding to a call request of the communication for emergency situation sent from the emergency communication call part 206, the following is performed in time of emergency: the output control part 202 switches the output adjustment of field strength from the normal mode to the emergency mode, and controls the field strength used for the communication for emergency situation to be strong enough to interfere with communication between the other mobile stations and the base station 100 (S11), and the mobile station side transmission part 208, by outputting a signal at strong field strength, interferes with communication from the other mobile stations (in FIG. 1, the mobile station 200b, . . . , the mobile station 200n) to the base station 100 (S12). It is based on the characteristic of the CDMA system that it is easy to interfere with communication with other mobile stations. This interference does not need to include the contents of communication (a flag indicating to be communication for emergency situation) which is included in Embodiment 2, and it is acceptable for the interference to be a noise indicating arbitrary contents or indicating nothing. The noise needs to be transmitted at the field strength strong enough to interfere with communication between the base station 100 and the other mobile stations.

The case of transmitting a sign indicating communication for emergency situation or terminal information of the mobile station 200a, as a flag indicating to be communication for emergency situation, should be included in the communication system according to Embodiment 2, not in the similar type of the present Embodiment.

In response to the above noise, the base station 100 transmits suppression signals of field strength to all the mobile stations for instructing to reduce outputs (field strength) (S13).

According to the output reduction instruction, mobile stations other than the mobile station 200a reduce field strength in response to the suppression signals, so that signals from the other mobile stations stop reaching the base station 100 and the communication stops (S14).

In the meantime, the mobile station 200a ignores the suppression signals of field strength from the base station 100, and transmits not an interference wave (noise), but the contents of the communication for emergency situation to the base station 100 at the maximum output permitted in time of emergency (S15). Suppose that the base station continues to output the output reduction instructions.

By detecting that links with the other mobile stations are disconnected, the base station 100 recognizes that the request of communication for emergency situation is sent from the mobile station 200a (S14, S15).

Moreover, according to the power control patents of Qualcomm, since the time constant of output rise is longer than the time constant of output reduction, the mobile station 200a can obtain an output relatively larger than the other mobile stations until the other mobile stations return outputs to the original ones. Therefore, even if the base station 100 does not send output reduction instructions, the base station 100 can recognize that the request of communication for emergency situation is sent from the mobile station 200a.

After this, the channel is established like Embodiment 1, and the communication for emergency situation is performed based on the normal communication procedure.

According to the present Embodiment, the mobile station 200a requesting the communication for emergency situation can inform the base station 100 that the mobile station 200a is requesting to establish a channel for emergency situation, by outputting only the noise to interfere with normal communication between other mobile stations and the base station 100, without including the contents notifying the emergency in the signal.

The communication systems according to all the Embodiments stated above can also be realized by the internal configuration of the base station 100 and the mobile station 200 as shown in FIG. 8.

In the communication system shown in FIG. 8, compared with the mobile station 200 of FIG. 3, the output control part 202 and the emergency communication call part 206 do not exist in the mobile station 200, and instead of them, an emergency communication management part 300 is needed between the mobile station 200 and the base station 100.

The emergency communication management part 300 includes an emergency communication call part 302 and an amplifier 304. In time of emergency, the emergency communication call part 302 requests to initiate a call of communication for emergency situation, and has the same function as the emergency communication call part 206 in the internal configuration of the mobile station 200 of FIG. 3. In response to the call request of the communication for emergency situation sent from the emergency communication call part 302, the amplifier 304 amplifies the power of the signal (the call signal of communication for emergency situation) transmitted from the mobile station side transmission part 208 to be field strength strong enough to interfere with communication between other mobile stations and the base station 100.

The base station side reception part 108 receives the call signal of communication for emergency situation amplified by the emergency communication management part 300. Subsequent operations are the same as those in Embodiment mentioned above. Compared with the base station 100 shown in FIG. 3, the output control part 102 is unnecessary for the base station 100 shown in FIG. 8.

The internal configuration of the mobile station 200 can be simplified by structuring the communication system as shown in FIG. 8. Since users' requirements of reduction in weight and downsizing of volume for the mobile station 200 are high, such users' requirements can be satisfied with the communication system illustrated in FIG. 8.

Summarizing the emergency communication etc. system explained in Embodiments 1 to 4, it becomes as follows:

1. Near-Far Problem

The near-far problem is a problem where a strong radio wave from a close-by station submerges a weak radio wave from a far station, and then it becomes impossible to decode the weak radio wave from the far station.

In FDMA system, since frequencies of radio waves from a close-by station and a far station are different, the near-far problem does not occur.

In TDMA system, since a radio wave from a close-by station and a radio wave from a far station are not transmitted simultaneously, the near-far problem does not occur.

In CDMA system, however, since all the stations perform transmission simultaneously using the same frequency, it becomes necessary to avoid the near-far problem.

For avoiding the near-far problem, two methods are known. One is the method of using a satellite as a base station. By making the base station sufficiently far from the earth, the distance to the base station becomes approximately constant wherever on the earth a mobile station may move, and thus the near-far problem can be avoided. The other is the method of making an output of a close-by station, whose radio wave is strong, weak and an output of a far station, whose radio wave is weak, strong. This method is called power control.

2. Emergency Communication of Channel Capacity Reservation Type

Distress communication, emergency communication, safety communication, and extraordinary communication are called "emergency communication etc."

In FDMA, a communication frequency for emergency, which one may not use in normal communication, is defined. Since the communication frequency for emergency is not used in the normal communication, by using this frequency, priority can be given to emergency communication etc. over the normal communication.

In TDMA, by defining a time slot for emergency, which one may not use in normal communication, priority can be given to emergency communication etc. over the normal communication.

Similarly, in CDMA, by defining a code for emergency, which one may not use in normal communication, priority can be given to emergency communication etc. over the normal communication.

The respect common to the three methods is that the frequency for emergency in the case of FDMA, the time slot for emergency in the case of TDMA, and the code for emergency in the case of CDMA are reserved for emergency communication. In other words, a part of channel capacity assigned as a bandwidth is reserved for giving priority to the emergency communication etc. seldom used. Normally, the reserved channel capacity is not efficiently used. This is not preferable in the respect of effective use of frequency resource which is limited resource.

3. Summary of the Emergency Communication etc. System Explained in Embodiments 1 to 4

3.1 Method of Transmitting Emergency Communication etc.

The state that a base station 0 communicates with n mobile stations (n≧2): a mobile station 1, a mobile station 2, ..., and a mobile station n, is considered. Normally, all the mobile stations perform normal communication. At this time, the mobile station 1 sends emergency communication etc. according to the following procedures:

1. The mobile station 1 temporarily increases its field strength seen from the base station 0.

2. The base station 0 continues outputting signals controlling all the mobile stations to maintain the output level having been kept.

3. Disregarding the output control signal from the base station, only the mobile station 1 outputs a strong radio wave.

4. It becomes impossible for the base station to decode radio waves from the other mobile stations because of the near-far problem.

Thus, the mobile station 1 is able to establish an exclusive channel which can use all the channel capacity for the base station 0.

3.2 In the Case of Two or More Stations Transmitting Emergency Communication etc.

At random time intervals, the emergency communication is transmitted by the method stated above. When connection of a station whose radio wave reached the base station first is completed, this first station reduces the output. Then, if a second or later station sends emergency communication etc., its radio wave reaches the base station.

4. Advantages of the Emergency Communication etc. System Explained in Embodiments 1 to 4

1. It is unnecessary to always reserve a part of channel capacity for emergency communication, which is unlike the emergency communication of the channel capacity reservation type.

2. It is possible to flexibly set up an emergency transmission speed.

3. In the case of the cellular system, the influence of emergency communication is not exerted on a cell which is far from the station transmitting the emergency communication.

4. It can be implemented by a small-scale modification.

5. The duty of listening to the emergency communication frequency is no longer required.

6. In the case of performing transmission for any use other than emergency communication, one will be punished under the Radio Law (because of intentionally causing crosstalk to occur over communication of other radio stations).

The above stated is the summary of the emergency communication etc. system explained in Embodiments 1 to 4.

In Embodiments 1 to 4 described above, explanations are provided with reference to CDMA as an example. Since a plurality of mobile stations use the same frequency simultaneously in CDMA, it is possible to submerge all communication of other mobile stations by the near-far problem, and since the near-far problem occurs easily in CDMA, CDMA is a communication method especially suitable for the invention described in the Embodiments. However, the present invention is not limited to CDMA, and is applicable to any communication method as long as the near-far problem occurs in the communication method. While there are several methods in CDMA, the direct sequence system applied in many systems is used in the present invention.

Moreover, according to the communication system of Embodiments 1 to 4, even if a method in which, in order to cope with the near-far problem, communication is performed between mobile stations and a base station, feedback loops are configured so that the field strength of each mobile station at the base station may become approximately constant, and outputs are adjusted at the mobile station sides (power control system) is adopted, the present invention can be utilized. Also, even if a system using the power control system or a method of using an artificial satellite as a base station and stations on the earth (the airspace also being included) as mobile stations is adopted, the present invention can be utilized.

Moreover, in Embodiments 1 to 4, the field strength which is output by the mobile station 200 and is strong enough to interfere with communication between the other mobile stations and the base station 100 in time of emergency may be about one hundred times the field strength used for normal communication, for example. It may be about 20 dB, for example.

In the case of distress communication, the field strength used for the communication for emergency situation is assumed to be about 10 kW for example, whereas the field strength used for normal communication by the mobile station 200 is about 100 W for example.

Embodiment 5

A transmission system that does not use a control channel in CDMA will be explained in the present Embodiment. Respects differing from Embodiments 1 to 4 will be mainly described in the present Embodiment.

According to the emergency communication etc. system explained in Embodiments 1 to 4, a radio wave is strengthened firstly. For example, it may need to increase the output by about 20 dB (decibels) to be higher than the normal output. It is because about 20 dB, for example, may be necessary to generate suppression based on the near-far problem in a reception part with high performance for GPS (global positioning system).

In this case, it needs to increase the output to be 100 times or the antenna gain to be 100 times temporarily, or to increase both of them as a combination of the methods. Though temporarily, it is necessary to increase the output by 20 dB, for example. Further, aside from a phased array antenna being expensive, for example, an antenna of a 20 dBi gain has sharp directivity (assuming that the gain of an antenna for normal communication is 0 dBi), and it is not easy to continue turning an antenna of sharp directivity toward a base station from a mobile station which moves at a high speed like an airplane. (dBi is an isotropic gain, which regards an antenna (isotropic antenna) outputting radio waves of the same strength to all directions, as a comparison standard. This is also called an absolute gain.) Then, a new method having no necessity of changing an output and a gain is considered.

The base station 100 and the mobile station 200 configuring the communication system according to the present Embodiment will be explained with reference to FIG. 9.

The communication system shown in FIG. 9 is a communication system by which the base station 100 and the mobile station 200a establish communication for emergency situation (emergency communication etc.). The base station 100 can be a ground station or a satellite.

In the mobile station 200, a special call part 206 switches a normal mode to an emergency mode, and the mobile station side transmission part 208 transmits a radio wave whose power (power spectrum density) of a transmitted signal at the center frequency $f_0$ of a carrier wave is high.

The base station 100 receives the radio wave whose power (power spectrum density) of the transmitted signal at the center frequency $f_0$ of the carrier wave is high, from the mobile station 200 which output communication for emergency situation. The base station 100 continues outputting suppression signals for suppressing signal intensity to the other mobile stations.

Then, communications of the other mobile stations are suppressed, and it becomes impossible for the base station 100 to receive communication except for the communication for emergency situation. Only the mobile station 200 which transmitted the communication for emergency situation establishes a channel (session) to the base station 100. After establishing the session, the mobile station 200 which sent the communication for emergency situation performs communication according to the normal communication procedure.

The internal configuration of the base station 100 and the mobile station 200 shown in FIG. 9 will be described.

The mobile station 200 using CDMA includes the output control part 202 for a function of normal power control, i.e., controlling field strength of a signal for performing normal communication. In addition, the mobile station 200 includes the communication control part 204 for controlling normal communication, the special call part 206 (corresponding to the emergency communication call part in Embodiments 1 to 4) for requesting the mobile station side transmission part 208 to initiate a call of communication for emergency situation in time of emergency, the mobile station side transmission part 208 for receiving a signal for radio communication from the communication control part 204 and transmitting it to the base station 100, and the mobile station side reception part 210 for receiving a signal for radio communication with the base station 100. The mobile station side transmission part 208 receives a call initiation of communication for emergency situation from the special call part 206, and without using the control channel in CDMA, generates an emergency radio wave signal (an example of a special radio wave signal) of a narrower band and higher power spectrum density than a spread radio wave signal generated using a spreading code, and sends it to the base station (details will be mentioned later).

As stated above, the special call part 206 in the mobile station 200 communicating with the base station 100 requests to initiate a call of communication for emergency situation in time of emergency (an example of initiating a special call) by the direct sequence system using the spreading code. In response to the request from the special call part 206, the mobile station side transmission part 208 generates an emergency radio wave signal of a narrower band and higher power spectrum density than a spread radio wave signal generated using the spreading code, and sends it to the base station.

The signal of high power spectrum density herein means a signal with power spectrum density higher than that of a CDMA signal for performing normal communication, used by the mobile station 200 utilizing CDMA. The extent of the height should be high enough to be distinguished from the CDMA signal for performing normal communication, in extracting the signal of high power spectrum density.

On the other hand, the base station 100 includes the output control part 102 for controlling field strength of a signal used for radio communication with the mobile station 200, the base station side transmission part 110 (or just called a transmission part hereinafter) for transmitting the signal for radio communication with the mobile station 200, the base station side reception part 108 for receiving the signal for radio communication with the mobile station 200, the detection part 106 for detecting a call signal of communication for emergency situation from the received signal based on the signal received by the base station side reception part 108, and the communication control part 104 for controlling normal communication.

In this way, by the direct sequence system using a spreading code, the base station side reception part 108 (or just called a reception part hereinafter) in the base station 100 which communicates with a plurality of mobile stations 200 receives a spread radio wave signal generated using the spreading code, from each of a plurality of mobile stations 200, and receives a special radio wave signal of a narrower band and higher power spectrum density than the spread radio wave signal, from a mobile station. The detection part 106 detects whether the base station side reception part 108 has received the special radio wave signal or not. Then, the base station side transmission part 110 transmits an assignment signal for assigning a channel to the mobile station 200 which had transmitted the special radio wave signal detected by the detection part 106.

The base station side reception part 108 includes two reception parts of a spread signal reception part 107 and a special signal reception part 109. The spread signal reception part 107 receives a spread radio wave signal, and performs spread demodulation of the received signal by using a spreading code of a predetermined chip rate, to acquire an information signal. The special signal reception part 109 receives a special radio wave signal, and performs spread demodulation of the received signal by using a code having a rate lower than the chip rate of the spreading code, as a special code, to acquire an information signal.

FIG. 10 shows a configuration of the mobile station side transmission part 208.

FIG. 11 shows a configuration of the spread signal reception part 107 of the base station side reception part 108.

FIG. 12 shows a configuration of the special signal reception part 109 of the base station side reception part 108.

In FIG. 10, an information modulation part 312 of the mobile station side transmission part 208 performs the first modulation (information modulation) of superimposing a baseband signal (a digital signal) on a carrier. A spreading code generation part 315 generates a spreading code required for spreading. A spread modulation part 313 performs the second modulation (spread modulation) of spreading an information modulation signal (spectrum) modulated through the first modulation by the spreading code generation part 315, by superimposing a spreading code on the information modulation signal by using an exclusive OR circuit 320. A frequency conversion part 317 converts the frequency of a spread modulation signal modulated through the second modulation (spread modulation), and a power amplification part 318 outputs a spread radio wave signal from an antenna 319 upon performing power control in accordance with a direction of the output control part 202.

One bit of a spreading code herein is called a chip in distinction from an information signal. A clock frequency (a clock pulse) of a spreading code is called a chip rate.

Although the spreading code is a binary signal as well as a baseband signal to be transmitted (in practice, an information modulation signal modulated by the information modulation part 312), the speed of change of the spreading code is set up to be faster than that of the baseband signal. Assuming that time of one rectangular wave (or called a pulse, one pulse indicates one bit) of a baseband signal is Ts, the bit rate (transmission speed and its unit is bps: bit per second) of this signal becomes $1/T_S$. Similarly, assuming that time of one rectangular wave (called a chip) of a spreading code is $T_C$, the chip rate (transmission speed of a chip, and its unit is cps: chip per second) becomes 1/Tc.

In FIG. 13, the horizontal axis indicates a frequency f, the vertical axis indicates a power spectrum density p(f), $f_0$ indicates the center frequency of a carrier wave, B indicates the frequency band of a spreading code (a chip rate of a spreading code), and A indicates the frequency band (data rate) of an information modulation signal.

In the direct sequence system, the phase of an information modulation signal is switched directly with a spreading code having a chip rate (clock frequency) higher than the frequency band A of the information modulation signal. The information modulation signal is modulated with a spreading code of the frequency band B (namely, of a high clock frequency) being wider than the frequency band A of the information modulation signal. In this way, the spread modulation signal spectrum is spread to the wide frequency band B according to the length of the spreading code (the number of bits of the spreading code), as shown in FIG. 13.

In FIG. 10, the special code generation part 316 generates a special code. The special code is a consecutive sequence of 1s, or a consecutive sequence of 0s, for example. When there is a request to initiate a call in time of emergency from the special call part 206, a switch 314 switches the spreading code from the spreading code generation part 315 to the special code from the special code generation part 316.

In FIG. 11, the spread signal reception part 107 of the base station side reception part 108 performs inverse processing to modulation (that is, demodulation) to reproduce the original information signal (a digital signal). A spread radio wave signal received by an antenna 411 is amplified by a high frequency amplification part 412, and frequency conversion is performed on it by a frequency conversion part 413. In a code synchronization part 414, the code phase of the spreading code experienced a delay through the transmission channel is estimated by using a synchronous circuit. In a spreading code generation part 415, a spreading code being the same as that of the transmission side is generated. In an exclusive OR circuit 420 of a spread demodulation part 416, despreading is performed with multiplication by the spreading code. The received signal after the despreading is demodulated by an information demodulation part 417 to restore the information signal.

Moreover, a power strength measurement part 419 measures a field strength of the spread radio wave signal received by the antenna 411, and outputs the measurement result to the output control part 102 for directing power control to the mobile station 200.

In this way, the spread signal reception part 107 of the base station side reception part 108 performs normal information demodulation after it performs despreading or spread demodulating for restoring the spread modulation signal being spread, at the reception part side, to the original information modulation signal.

In FIG. 12, the special signal reception part 109 of the base station side reception part 108 performs inverse processing to modulation (that is, demodulation) to reproduce the original information signal (a digital signal), measures the field strength of the frequency $f_0$ of the signal to be received, and outputs the measurement result to the detection part 106 for judging whether an emergency signal from the mobile station 200 exists or not.

In a spread radio wave signal received by an antenna 511, only the neighboring portion centered on the center frequency $f_0$ is amplified by a high frequency amplifier 512, and frequency conversion is performed on it by a frequency conversion part 513. In a code synchronization part 514, the code phase experienced a delay through the transmission channel is estimated by using the synchronous circuit. In a special code generation part 515, the same special code as that of the transmission side is generated. In an exclusive OR circuit 520 of the spread demodulation part 416, despreading is performed with multiplication by the special code. The received signal after the despreading is demodulated by the information demodulation part 417 to restore the information signal.

A special radio wave signal detection part 599 detects a special radio wave signal. The special radio wave signal detection part 599 is provided with a band path filter. The band path filter filters a signal of the neighboring portion centered on the center frequency $f_0$ in the signal received by the antenna 511. The filtered signal, after performing required demodulation, is output to the detection part 106. In the detection part 106, the content of the signal is decoded and it is judged based on the content that an emergency signal has been transmitted from the mobile station 200. Since the subsequent operation is the same as that of Embodiments 1 to 4, explanation for it is omitted.

In the case the special radio wave signal is included in a normal spread radio wave signal, since the special radio wave signal is of a narrow band, if the normal spread radio wave signal is despread using a spreading code, a special radio wave signal (noise) is spread to be disregarded. Therefore, even when the special radio wave signal is included in the normal spread radio wave signal, there is little interference to the CDMA communication with the normal spread radio wave signal.

In addition, since it is enough for the special signal reception part 109 to receive only the radio wave of the neighboring portion centered on the center frequency $f_0$, it is desirable to filter only the neighboring portion of the center frequency $f_0$ in the spread radio wave signal and to amplify it by the high frequency amplifier 512. However, by performing despreading with multiplication by the special code in the spread demodulation part 416, since only the signal of the neighboring portion of the center frequency $f_0$ in the spread radio wave signal can be extracted as a result, it is not necessary to filter only the neighboring portion of the center frequency $f_0$.

Operations will be explained with reference to FIGS. 10 to 12.

The present Embodiment is based on a discovery, which was resulted from consideration of what an essential reason enabling emergency communication etc. in emergency communication etc. system explained in the Embodiments 1 to 4 is, that the same system can be realized by increasing not an "output" but a "power spectrum density."

The power spectrum density (PSD: Power Spectrum Density) herein means the power of a transmitted signal at a certain frequency. It in context means the power of a transmitted signal at the center frequency $f_0$ of the carrier wave. The larger the power of a signal being transmitted, the larger the influence on other circuits becomes. For this reason, generally, restriction of power of a transmitted signal at a specific frequency band is prescribed in many cases so that influence on other circuits may become slight. However, in the present Embodiment, emergency communication etc. is enabled by increasing power spectrum density of a transmitted signal at a specific frequency band. It is preferable to increase power spectrum density of a transmitted signal at the center frequency $f_0$ of a carrier wave, because the configuration of the mobile station side transmission part 208 does not become complicated.

"Output" is what is obtained by integrating power spectrum density over a bandwidth.

It is possible to increase power spectrum density without changing the output power. Especially in the case of a CDMA system with a high spreading factor, it is possible to increase power spectrum density. This method will be described in detail hereafter.

Suppose that there is a communication system composed of the base station 0, the mobile stations 1, 2, . . . , n ($n \geq 2$). In the case of there being two or more base stations, it can be reduced to the case of there being one base station based on the emergency communication etc. system explained in the Embodiments 1 to 4. Therefore, without loss of generality, it is possible to assume there is one base station.

Suppose that the other mobile stations 2, . . . , n are performing normal communication using the CDMA system. Similarly to the spread spectrum system, DS-CDMA spreads the spectrum, and therefore the power spectrum density is low.

In order to call the base station, the mobile station 1 outputs a radio wave with high power spectrum density and a small occupied bandwidth. This state is shown in FIG. 14 defining a frequency f as a horizontal axis and a power spectrum density p as a vertical axis.

In FIG. 14, the horizontal axis indicates a frequency f, the vertical axis indicates a power spectrum density p(f), and $f_0$ indicates a center frequency of a carrier wave (a spread modulation signal or a spread radio wave signal). Communication using DS-CDMA performing spread spectrum by the mobile stations 2, . . . , n and transmission using a narrow band by the mobile station 1 are performed at "equivalent outputs."

The meaning of this "equivalent outputs" will be explained using the case of the mobile station 1 and the mobile station 2 with reference to FIG. 15. "The equivalent outputs" means that the areas of the shaded parts (integration values of power spectrum density over bandwidth) of the mobile station 1 and the mobile station 2 are equal in FIG. 15. In the case of FIG. 15, if the frequency band of the mobile station 2 is B and its power is p, then the frequency band of the mobile station 1 is B/m and its power is mp. Therefore, the outputs of the mobile station 1 and the mobile station 2 become B×p=(B/m)×mp, namely they are equal. FIG. 15 shows the case when the outputs are equal, a radio wave with a smaller occupied bandwidth has a higher power spectrum density.

In this case, if a reception part (the special signal reception part 109) which selects and receives only neighborhood of the center frequency $f_0$ of the carrier wave is prepared in the base station separately from the normal reception part (the spread signal reception part 107), it is possible to easily judge whether a radio wave transmitted only in the band near the center frequency $f_0$ of the carrier wave exists or not. This is the fundamental idea of the present Embodiment.

That is, even if outputs of the transmission part are equal, as a radio wave with a smaller occupied bandwidth has a higher power spectrum density, it can be certainly distinguished from the other normal communication performing spread spectrum.

Then, when thinking about how to generate a radio wave with a small occupied band, two proposals can be considered.

The first proposal is to prepare another transmission part besides the transmission part used for DS-CDMA. That is, the proposal is to provide, aside from the normal mobile station side transmission part, another mobile station side transmission part that generates an emergency radio wave signal of a narrower band and higher power spectrum density than a spread radio wave signal generated using a spreading code, in response to a request from the special call part 206, and transmits it to the base station.

The second proposal is the configuration of the mobile station side transmission part 208 of FIG. 10 mentioned above.

The method of generating a signal with a small occupied band by using the transmission part (the mobile station side transmission part 208) used for CDMA will be described.

It is supposed that the transmission part is sending a DS-CDMA signal by a PSK (BPSK, QPSK etc.) modulator. The reason for citing PSK as an example is that PSK is employed in many of the practical systems using CDMA. A signal with a small occupied bandwidth can also be generated similarly in the case of using ASK, FSK, QAM etc.

In both of W-CDMA and CDMA2000, each as an example of an actual system, QPSK is used in the downlink and HPSK is used in the uplink for the spread modulation.

The PSK (Phase Shift Keying) system is a digital information modulation system in which a digital information bit (1/0) is represented by the amount (or existence) of a phase shift of a carrier wave, and is a modulation system in which the phase of the carrier wave is discretely changed according to a digital code.

BPSK (Binary Phase Shift Keying) is a system in which a phase of a carrier wave is changed based on the contents of information of a digital signal for relating them to 0 phase (in phase) and π phase (reversed phase), and one phase is set when one bit of a digital code appears.

QPSK (Quadrature Phase Shift Keying) is a system in which a phase of a carrier wave is changed based on the contents of information of a digital signal, wherein the phase of the carrier wave is taken every 90 degrees, information of two bits is transmitted in a unit time, and when two bits of a digital code appears, the phase is set.

ASK (Amplitude Shift Keying) is a modulation system in which existence or nonexistence of a carrier wave is made to be corresponding to a digital signal 1 or 0, and bit information (0, 1) of a baseband is made to be corresponding to binary amplitude (or ON/OFF) of the carrier wave.

FSK (Frequency Shift Keying) is a modulation system in which frequencies $f_1$ and $f_2$ of a carrier wave are made to be corresponding to digital signals 1 and 0, and bit information (0, 1) of a baseband is made to be corresponding to two frequencies of the carrier wave.

QAM (Quadrature Amplitude Modulation) is the one in which the modulation amplitude of QPSK is made to be binary. Since sixteen signal states can be acquired by 16 QAM, it is possible to transmit four bits at one time. By making the modulation amplitude be multiple values, there are 32, 64, 128, and 256 QAM and they can respectively transmit data of 5, 6, 7 and 8 bits.

In a PSK (BPSK, QPSK etc.) modulator, what is necessary to generate a signal with a small occupied bandwidth is just to input a consecutive sequence of 0s (000000 . . . ), or a consecutive sequence of 1s (111111 . . . ) into the spread modulation part 313 as a spreading code (a special code). The consecutive sequence of 0s (000000 . . . ) or the consecutive sequence of 1s (111111 . . . ) is an example of a special code.

FIG. 16 (*a*) shows a modulation result in the case of giving a consecutive sequence of all 0s (000000 . . . ) as a special code to the spread modulation part 313. An exclusive OR of the information signal and the special code is calculated by the exclusive OR circuit 320, and a modulation signal is output. In this case, since the output from the spread modulation part 313 is an information signal as it is, it becomes equal to a non-modulation signal because of not being spread, and becomes a signal with an extremely small occupied bandwidth.

FIG. 16 (b) shows a modulation result in the case of giving a consecutive sequence of all 1s (111111 . . . ) as a special code to the spread modulation part 313. In this case, the output from the spread modulation part 313 is an inversion signal being an inversed information signal and having an extremely small occupied bandwidth.

As reference, FIG. 16 (c) shows a modulation result in the case of giving a consecutive sequence of 0s and 1s (0101010 . . . ) as a spreading code to the spread modulation part 313. In this case, since an exclusive OR of the information signal and the special code is calculated, the output from the spread modulation part 313 is an information signal spread by the spread signal and then has an occupied bandwidth almost equal to a chip rate.

In the case of ASK, FSK, and QAM, as is the case with the PSK (BPSK, QPSK etc.) modulator, if a consecutive sequence of 0s or a consecutive sequence of 1s is input as a spreading code (special code) into the spread modulation part 313, an output equal to a non-modulation signal or an output of an inversion signal can also be obtained. In addition, in the case of ASK, there is a possibility of "no output" when a consecutive sequence of 0s is given as a spreading code. In such a case, a consecutive sequence of 1s should be given.

The length of the consecutive sequence of 0s or the consecutive sequence of 1s changes depending upon how small the occupied bandwidth is set to be. In the case of setting the occupied bandwidth to 1/m of the normal one (power spectrum density is m times the normal one), it is necessary to input a sequence made of m consecutive 1s or 0s. For example, when a carrier wave with an occupied bandwidth of 4 MHz is formed by 01010101 . . . , a carrier wave of 1 MHz and four times power spectrum density can be formed by 0000111100001111 . . . .

Speaking more generally, it is possible to change the occupied bandwidth by changing the chip rate in the DS-CDMA system.

The relation between the occupied bandwidth B and power spectrum density p(f) will be considered hereafter with reference to FIG. 17. The relation among the output P of the transmission part, the frequency f, and the power spectrum density p(f) can be given by the following equations:

[Equation 1]

$$P = \int_0^\infty p(f)df \quad (1)$$

Normally, a band is restricted so that p(f) may form the following in relation to the center frequency $f_0$.

[Equation 2]

$$\begin{cases} p(f) \neq 0 & (f_0 - B/2 \leq f \leq f_0 + B/2) \\ p(f) = 0 & \text{otherwise} \end{cases} \quad (2)$$

Therefore, it is enough for the integral interval to be [$f_0$−B/2, $f_0$+B/2]. Then, the equation (1) is transformed as follows:

[Equation 3]

$$P = \int_{f_0 - \frac{B}{2}}^{f_0 + \frac{B}{2}} p(f)df \quad (3)$$

Further, in the case of CDMA, where p(f) is approximated to be a constant value p in [$f_0$−B/2, $f_0$+B/2], regardless of the frequency, the equation (3) becomes as follows:

$$P = pB \quad (4)$$

According to the equation (4), when the output P is constant, the occupied bandwidth B is in inverse proportion to the power spectrum density p.

FIG. 17 (a) shows the case of the occupied bandwidth=B and the power spectrum density=p, and FIG. 17 (b) shows the case of the occupied bandwidth=2B and the power spectrum density=p/2. Areas of the shaded parts of (a) and (b) are equal, and namely the output is constant.

In the case of CDMA, the occupied bandwidth B is determined only by a chip rate. Therefore, it is possible to increase the power spectrum density only by decreasing the chip rate. As can be understood from the equation (4), when the output of the transmission part is set to be constant, if the chip rate is set to be 1/m of the normal one, the power spectrum density p becomes m times the normal one. In the case of CDMA, the chip rate is normally high, and m=100 to about 1000 can be easily secured, for example.

If signals with the 1/m chip rate and m times power spectrum density p are incidentally output from a plurality of mobile stations, crosstalk will occur. In that case, however, it is enough to cause a delay of an arbitrary time at random and then try to transmit again, like Embodiment 2.

What is necessary to decrease the chip rate is just to use a code of consecutive 0s or 1s as a spreading code, instead of the normal Walsh code (in the case of synchronous CDMA) or other spreading codes (in the case of asynchronous CDMA, a M sequence code or a code typified by Gold sequence or Kasami sequence). Then, the spread spectrum is no longer performed and the power spectrum density becomes high. Furthermore, it is unnecessary to alter the transmission part and modulator themselves. The Walsh code is a code used for identification of a downlink signal instead of the spreading code.

A correlation of the code of consecutive 0s or 1s with other spreading codes, such as a Walsh code, an M sequence code, and a Gold sequence code, is low. It is because other spreading codes are also designed to have a low correlation with a direct-current component. Therefore, even when a special radio wave signal is despread, it will be regarded as a noise, and the interference to communication of other stations is kept to the minimum.

In this way, generation of a radio wave with a narrow occupied bandwidth and high power spectrum density can be realized by the relatively easy method, and further, information can be certainly transmitted to the base station without interfering communication of other stations.

As mentioned above, the base station side reception part 108 according to the present Embodiment includes the spread signal reception part 107 which receives a spread radio wave signal, and performs spread demodulation using a spreading code of a predetermined chip rate to acquire an information signal, and the special signal reception part 109 which receives a special radio wave signal, and performs spread demodulation using a code having a rate lower than the chip rate of the spreading code, as a special code, to acquire an information signal.

The mobile station side transmission part 208 according to the present Embodiment includes the spreading code generation part 315 which generates a spreading code of a predetermined chip rate, the special code generation part 316 which generates a code having a rate lower than the chip rate of the spreading code, as a special code, and the switch 314 which switches the spreading code generation part 315 and the special code generation part 316 depending upon whether there is a request from the special call part 206 or not.

Application examples of the present Embodiment will be explained.

Application 1.

In the system previously described in the present Embodiment, a radio wave of a narrow band with a δ function-like spectrum is generated at the center frequency of spread spectrum, because, in view of the configuration of the transmission part, it is easier to stand a δ function-like spectrum at the center frequency. Essentially, this spectrum may stand anywhere (within the frequency band B being spread). This can be realized by the double modulation used in the normal CDMA system and the frequency conversion part 317.

Application 2.

It is also acceptable to change the position where the δ function-like spectrum is made to stand with time. For example, it is made to be a spectrum of a frequency $f_0+f_1$ at the time T1, to be a spectrum of a frequency $f_0+f_2$ at the time T2, and to be a spectrum of a frequency $f_0+f_3$ at the time T3. This can be realized by using the technology of the frequency hopping system.

Moreover, as shown in FIG. 23, it is also acceptable to convey on/off of information by switching the frequency $f_1$ and $f_2$ of a signal with time. That is, it is acceptable to convey information by the FSK system.

Application 3.

As shown in FIG. 24, it is also acceptable to generate an information modulation signal of frequency $f_1$ and superimpose it on a carrier wave of the center frequency $f_0$. In this case, since the information modulation signal of frequency $f_1$ is divided into two signals of $f_0+f_1$ and $f_0-f_1$, the power spectrum density becomes ½.

Moreover, it is also acceptable to convey information by switching the frequency by the FSK system as Application 2.

Application 4.

In Application 3, the information modulation signal of frequency $f_1$ is generated. It is also acceptable to generate a signal of frequency f, by a spreading code and superimpose it on a carrier wave of the center frequency $f_0$. Also in this case, as shown in FIG. 24, since the signal is divided into two signals of $f_0+f_1$ and $f_0-f_1$, the power spectrum density becomes ½.

Moreover, it is also acceptable to convey information by switching the frequency by the FSK system as Application 2.

The system according to the present Embodiment has the following advantages:

1. The protocol is simple and therefore highly reliable.
2. This system can be installed even in the conventional CDMA communication system already used, by expansion of separately installing a transmission part. The expansion may be easier (considering compatibility with the past) than the method of changing the protocol, such as adding a control channel.
3. It is enough for the mobile station side to include one transmission part and one antenna, which enables the simple configuration.
4. Processing is performed only by a digital signal without giving any change to the modulation part of the transmission part. In other words, remodeling of the transmission part (mobile station) side is almost unnecessary, and, if the CDMA system has already been completed, it is enough to modify only the digital circuit part.
5. It does not interfere with other stations under communication.

The communication by this method does not interfere with communication of other stations. In other words, if the ratio B/B', being the ratio of the width B of the spectrum used in the normal communication and the width B' of the spectrum used in the communication of a narrow band, is sufficiently larger than 1, the influence given on the normal communication is small according to the characteristic of DS-SDMA. That the influence is small herein means that an increase of BER (Bit Error Rates) in communication by others can be suppressed.

6. It is not necessary to increase the output or to change the antenna gain.

The last three respects (4, 5, 6) are advantages in comparison with the emergency transmission system according to Embodiments 1 to 4.

Owing to these advantages, this proposed method is applicable not only to the emergency communication etc. but also to normal communication transmission. It is because this proposed method does not interfere with communication of other stations and it is not necessary for this method to exceed the permitted transmission power. Of course, this system can also be used for transmission of emergency communication etc. In that case, the advantage of the emergency communication etc. transmission system of Embodiments 1 to 4 that "it is not necessary to reserve a part of channel capacity for emergency communication etc. which is not normally used" is completely the same. The communication means can also be the same. Furthermore, the advantage of this system that it is unnecessary to increase the transmission power, like Embodiments 1 to 4, can also be applied. The special transmission herein is transmission by a radio wave using a special code, not a spreading code, with a chip rate lower than that of a spreading code. Alternatively, the special transmission means transmission by a radio wave that is not spread using a spreading code.

Compared with the former system, problems to be solved are as follows:

It is necessary to prepare two reception parts in the base station.

The channel capacity is not arbitrary. Moreover, the channel capacity is restricted to the frequency band B, namely small.

As to the latter, however, although much information cannot be transmitted in the communication with small channel capacity (namely, low speed), it is considered this small channel capacity is enough for a mobile station to perform a transmission request to the base station, by the reason explained below.

In response to the transmission request from the mobile station, the base station performs as follows:

1. Assign a code for normal communication etc. to the mobile station.
2. Perform communication between the base station and the mobile station by using the code assigned in 1.

A means for returning to the normal communication after assigning the code to the mobile station in the above-mentioned procedure should be defined beforehand. In this case, the respect as to finally returning to the normal communication is the same as that of Embodiments 1 to 4. Therefore, it is enough for the communication by the system of the present Embodiment to perform only the respect of 1. There is no need to transmit much information in the system of the present Embodiment as long as only the respect of negotiation for establishing normal communication is performed.

The respect of the system according to the present Embodiment essentially differing from the system according to Embodiments 1 to 4 is that the present system is able to be used for transmission of normal communication. Being applicable to the transmission of normal communication means being applicable to almost all the communication. That is, it is possible to make communication having a high priority and accepted to be slow speed and communication having a low priority and requested to be high speed coexist, which provides a more general system.

Embodiment 6

In the present Embodiment, respects differing from Embodiment 5 will be mainly explained.

FIG. 18 shows what is configured by removing the spread demodulation part 516, the code synchronization part 514, and the special code generation part 515 from the special signal reception part 109 of the base station 100 in FIG. 12.

The special signal reception part 109 outputs the signal on which frequency conversion is performed in the frequency conversion part 413, as it is, to the information demodulation part 417 without despreading it. Then, it is demodulated in the information demodulation part 417 to restore the information signal.

When an information signal is output intact from the spread modulation part 313 of the mobile station 200, namely when the information signal is the same as a non-modulation signal, the special signal reception part 109 of the base station 100 does not need to perform despreading because it receives the signal that is not spread.

As stated above, the base station side reception part 108 according to the present Embodiment includes the spread signal reception part 107 which receives a spread radio wave signal and performs spread demodulation of it by using a spreading code to acquire an information signal, and the special signal reception part 109 which receives a special radio wave signal to acquire an information signal without performing spread demodulation.

In this way, it is possible to realize the special signal reception part 109 of the base station side reception part 108 by the simple configuration.

Embodiment 7

In the present Embodiment, respects differing from Embodiment 5 will be mainly explained.

FIG. 19 shows what is configured by providing the switch 314 in the spread modulation part 313 of the mobile station side transmission part 208 in FIG. 10. When there is a special transmission request from special call part 206, the switch 314 outputs the information signal to the frequency conversion part 317 without spreading it. In this way, the information signal, as it is, is output from the spread modulation part 313 of the mobile station 200.

Thus, the mobile station side transmission part 208 according to the present Embodiment includes the spreading code generation part 315 which generates a spreading code, and the spread modulation part 313 which performs spread modulation of the information signal by using the spreading code generated by the spreading code generation part 315. When there is a request from the special call part 206, the spread modulation part 313 outputs the information signal as a non-modulation signal, without modulating it.

Embodiment 8

In the present Embodiment, respects differing from Embodiment 5 will be mainly explained.

FIG. 20 shows what is configured by providing a switch 514 in the spread demodulation part 416 in FIG. 11, and further providing the special code generation part 515, and making the configuration to be the base station side reception part 108. When the detection part 106 detects special transmission, the switch 514 despreads the information signal by using the special code from the special code generation part 515.

It is enough for the special signal reception part 109 of FIG. 11 to receive only radio waves in the neighboring portion centered on the center frequency $f_0$. However, since the base station side reception part 108 of FIG. 20 receives both the spread radio wave signal of bandwidth B and the radio wave signal in the neighboring portion centered on the center frequency $f_0$, it should not filter only the neighboring portion centered on the center frequency $f_0$. As a result of multiplication by a special code to perform despreading in the spread demodulation part 416, only the signal in the neighboring portion centered on the center frequency $f_0$ in the spread radio wave signal can be extracted. Therefore, there is no problem without filtering the neighboring portion centered on the center frequency $f_0$.

On the other hand, the power strength measurement part 419 of the base station side reception part 108 must surely measure, in addition to measuring the normal field strength, the field strength of the frequency $f_0$ (neighboring portion centered on the center frequency $f_0$) of a spread radio wave signal, in order to judge whether there is an emergency signal from the mobile station 200 or not.

As stated above, the base station side reception part 108 of the present Embodiment includes the spreading code generation part 415 which generates a spreading code of a predetermined chip rate, the special code generation part 515 which generates a code of a rate lower than the chip rate of the spreading code, as a special code, and the switch 514 which switches the spreading code generation part 415 and the special code generation part 515 depending upon whether a special radio wave signal from a mobile station has been received or not.

According to the present Embodiment, it is not necessary to provide the special signal reception part 109.

Embodiment 9

In the present Embodiment, respects differing from Embodiment 5 will be mainly explained.

FIG. 21 shows what is configured by providing a switch 421 in the spread demodulation part 416 of FIG. 12 and making the configuration to be the base station side reception part 108. When the detection part 106 detects special transmission, the switch 421 outputs the signal from the frequency conversion part 413 without despreading it.

It is enough for the special signal reception part 109 of FIG. 11 to receive only radio waves in the neighboring portion centered on the center frequency $f_0$. However, since the base station side reception part 108 of FIG. 21 receives both the spread radio wave signal of bandwidth B and the radio wave signal in the neighboring portion centered on the center frequency $f_0$, it should not filter only the neighboring portion centered on the center frequency $f_0$. Since the spread demodulation part 416 outputs the signal from the frequency conversion part 413 intact without despreading it when the detection part 106 detects special transmission, a signal with high power spectrum density in the neighboring portion centered on the center frequency $f_0$ can be extracted. Therefore, there is no problem without filtering the neighboring portion centered on the center frequency $f_0$.

On the other hand, the power strength measurement part 419 of the base station side reception part 108 must surely measure, in addition to measuring the normal field strength, the field strength of the frequency $f_0$ (neighboring portion centered on the center frequency $f_0$) of a spread radio wave signal, in order to judge whether there is an emergency signal from the mobile station 200 or not.

As stated above, the base station side reception part 108 of the present Embodiment includes the spreading code generation part 415 which generates a spreading code, and the spread demodulation part 416 which receives a spread radio wave signal and performs spread demodulation of it by using the spreading code generated by the spreading code generation part 415 to acquire an information signal. When receiving a special radio wave signal from a mobile station, the spread demodulation part 416 outputs it as a non-demodulation signal without performing spread demodulation.

According to the present Embodiment, it is not necessary to provide the special signal reception part 109.

As mentioned above, in and after Embodiment 5, the mobile station includes the special call part which requests to initiate a special call, and the mobile station side transmission part, in response to the request from the special call part, which generates a special radio wave signal of the same power as the power used in the direct sequence system, of a narrower band than the band used in the direct sequence system and of high power spectrum density, and transmits it to the base station.

Moreover, it is a feature that the mobile station includes the spread modulation part which performs spread modulation of an information signal, and the mobile station side transmission part generates a special radio wave signal of high power spectrum density, by passing the spread modulation part.

Moreover, it is a feature that the mobile station side transmission part includes the special code generation part which generates a special code of a direct-current component, and the spread modulation part which performs spread modulation of an information signal by using the special code generated by the special code generation part. The mobile station side transmission part generates a special radio wave signal of high power spectrum density by performing spread modulation of the information signal by using the special code of the direct-current component.

Further, it is a feature that the mobile station includes the communication control part which restricts the bit rate of the information signal to be low when the mobile station side transmission part generates a special radio wave signal, in order to increase the power spectrum density of the special radio wave signal by restricting the bit rate to be low.

Moreover, in and after Embodiment 5, the base station includes the base station side reception part which receives a special radio wave signal of the same power as the power used in the direct sequence system, of a narrower band than the band used in the direct sequence system and of high power spectrum density, from a plurality of mobile stations, the detection part which detects whether the base station side reception part received the special radio wave signal or not, and the base station side transmission part which transmits an assignment signal for assigning a channel to the mobile station which had transmitted the special radio wave signal detected by the detection part.

Moreover, the base station side reception part includes the special signal reception part which receives a special radio wave signal to acquire an information signal without performing spread demodulation.

Moreover, the base station side reception part includes the special signal reception part which receives a special radio wave signal and acquires an information signal by performing spread demodulation of the special radio wave signal by using a special code composed of a direct-current component.

Moreover, the special signal reception part includes the power strength measurement part which measures power spectrum density of a signal to be received, and outputs it to the detection part.

Moreover, the base station side reception part includes the spread demodulation part which receives a spread radio wave signal to acquire an information signal by performing spread demodulation, and when receiving a special radio wave signal from a mobile station, the base station side reception part outputs the special radio wave signal as a non-demodulation signal without performing spread demodulation, by passing the spread demodulation part.

Moreover, the base station side reception part includes the spreading code generation part which generates a spreading code of a predetermined chip rate, the special code generation part which generates a special code composed of a direct-current component as a spreading code, and the switch which switches the spreading code generation part and the special code generation part, depending upon whether the special radio wave signal from a mobile station is received or not.

Summary of the system according to Embodiments 5 to 9 will be further described.

1. The system of Embodiments 1 to 4 realizes priority communication with utilizing the near-far effect by increasing field strength. (A high power output is not necessarily required in increasing field strength, because it is possible to increase the field strength if an antenna gain can be changed.)

2. However, the necessity of increasing the field strength is not for clear distinction from communication by others. That is, it has been described in Embodiments 5 to 9 that it is not necessarily needed to increase the power spectrum density over the entire band.

3. In other words, essence of Embodiments 5 to 9 is that it is satisfying if information can be transmitted to a base station, not by submerging communication by others entirely with large field strength, but by increasing power spectrum density (the unit is W/Hz) by narrowing a bandwidth even if an output is the same, since, for example, even if an antenna power is the same, power spectrum density can be increased.

4. "Setting the spreading factor to 1 by using a special code" is one of methods of increasing power spectrum density, which is simple and effective. As another method, bypassing a spread modulator is an easy way to narrow the bandwidth and increase the power spectrum density.

Moreover, it is possible to obtain the same effect as bypassing the spread modulator, by changing the spreading code into a direct-current component (all 1s or all 0s) with leaving the spread modulator as it is.

5. Moreover, it is possible to further increase the power spectrum density by passing the spread modulation part and restricting the bit rate of an input signal to be low. (This assumption may be appropriate since large amount of data need not be transmitted for emergency communication etc. or for the use as a control signal.)

The configuration explained in and after Embodiment 5 can be used in combination. Moreover, the configuration explained in Embodiments 1 to 4 can be used in combination with the configuration explained in and after Embodiment 5.

In the communication systems according to all the Embodiments mentioned above, the following can be considered as an example of the method of the mobile station 200's initiating a call of communication for emergency situation: an emergency button is provided in the interface of the mobile station 200, a function of transmitting a signal which stores data indicating emergency is linked to the emergency button, and a call of communication for emergency situation is initiated by a user's pushing the emergency button.

The communication systems according to all the Embodiments can be realized by making small alteration to the communication system conventionally used. Therefore, when applying the communication system according to the present invention to the communication using the CDMA system, it is possible to preferentially deal with communication for emergency situation by using a comparatively simple protocol. Although the communication control method according to the present invention is simple, because of the simplicity, it is easy to implement, and since the number of component parts is small, it is possible to reduce the cost and enhance the reliability.

FIG. 22 shows a computer basic configuration of the base station 100 and the mobile station 200.

In FIG. 22, a CPU 40 which executes programs is connected with a monitor 41, a keyboard 42, a mouse 43, a communication port 44, a magnetic disk drive 46 etc. through a bus 38.

An OS 47, a program group 49, and a file group 50 are stored in the magnetic disk drive 46. The form in which the program group 49 and the file group 50 are united to be an object-oriented program group 49 can be considered as one of the Embodiments.

In the case that each part structuring the base station 100 and the mobile station 200 is implemented with a program, the present invention is executed, for instance, by storing a program in which operations to be executed by the output control part 202 are coded and a program in which operations to be executed by the emergency communication call part 206, the special call part 206 and so on are coded in the magnetic disk drive 46 as the program group 49, and by executing each program stored in the magnetic disk drive 46 with the CPU 40 and the OS 47.

In each of the above-mentioned Embodiments, the base station 100 and the mobile station 200 use the function of the communication port 44, and radio communication is performed.

In all the Embodiments, each operation of each configuration element relates to each other, and taking the relation of the operations stated above into consideration, the operation of each configuration element can be replaced as a series of operations. And such replacement enables them to be Embodiments of a method invention.

Moreover, replacement of the operation of each configuration element by processing of each configuration element enables them to be Embodiments of a program.

Moreover, by storing the program in a computer-readable recording medium in which a program is stored, they can be Embodiments of a computer-readable recording medium stored in a program.

Embodiment of a program and Embodiment of a computer-readable recording medium stored in a program can be configured by a program the entirety of which is operable in a computer.

Moreover, it is also possible to configure a software defined radio by using software to make a personal computer operate as a radio.

Each processing in Embodiment of a program and Embodiment of a computer-readable recording medium storing a program can be executed by a program, which is stored in a recording device, loaded from the recording device into a central processing unit (CPU), and executed by the central processing unit.

Moreover, it is also acceptable to realize software and a program of each Embodiment by firmware stored in ROM (READ ONLY MEMORY). Otherwise, it is also acceptable to realize each function of the program mentioned above by a combination of software, firmware, and hardware.

Figure 1:
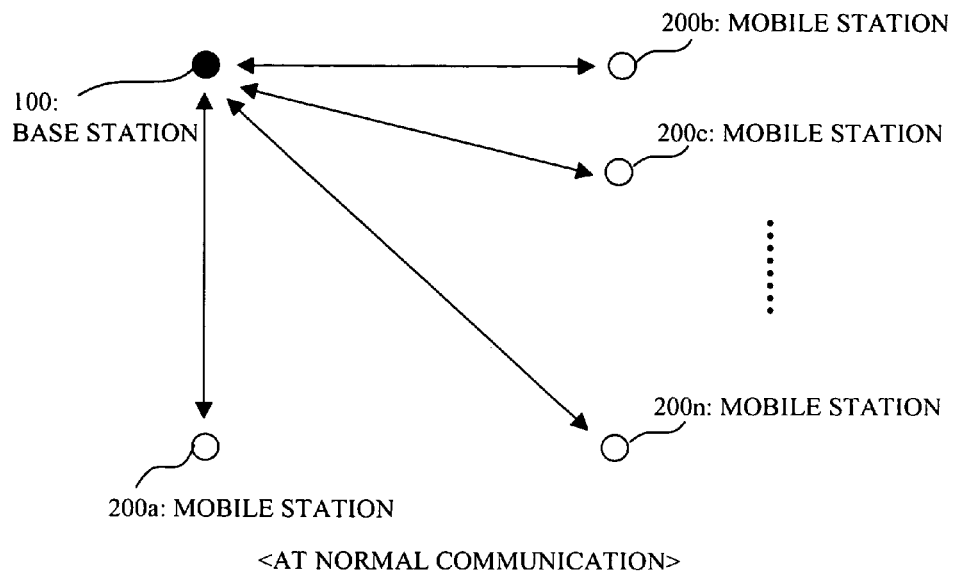
FIG. 1 shows normal communication of a base station and a mobile station.
Figure 2:
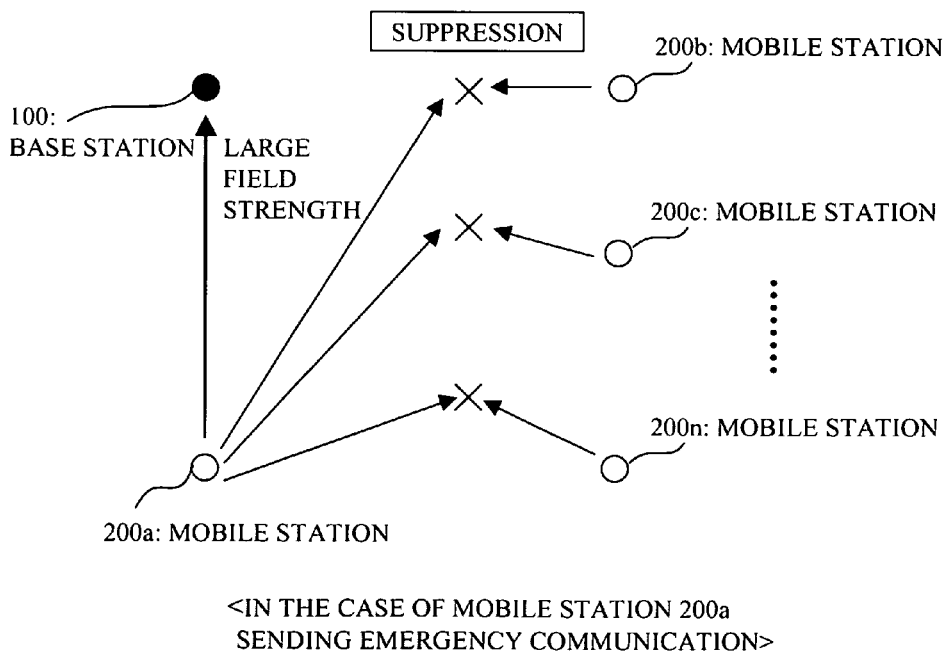
FIG. 2 shows a communication state when a mobile station sends communication for emergency situation.
Figure 3:
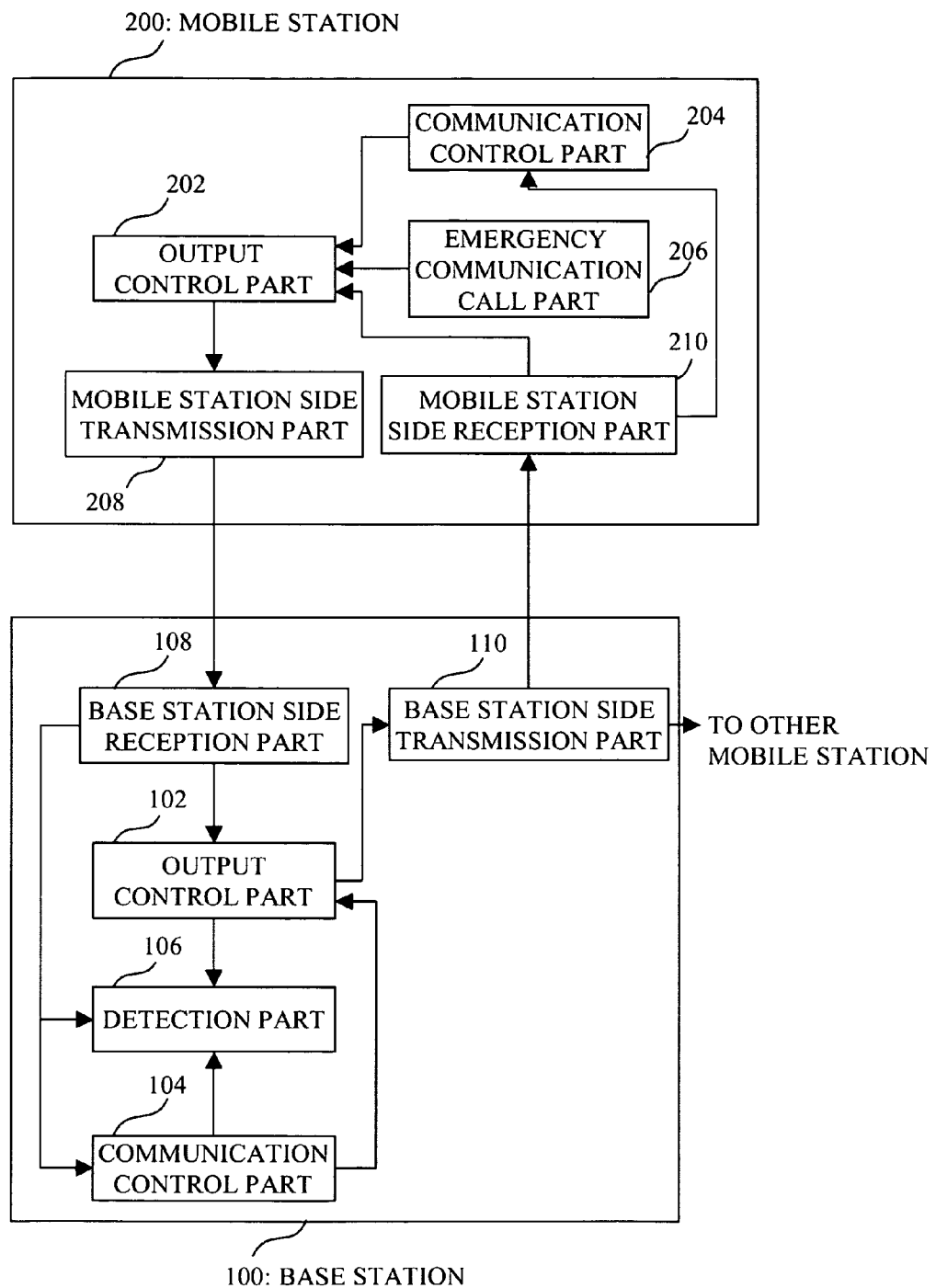
FIG. 3 shows an internal configuration of a base station and a mobile station.
Figure 4:
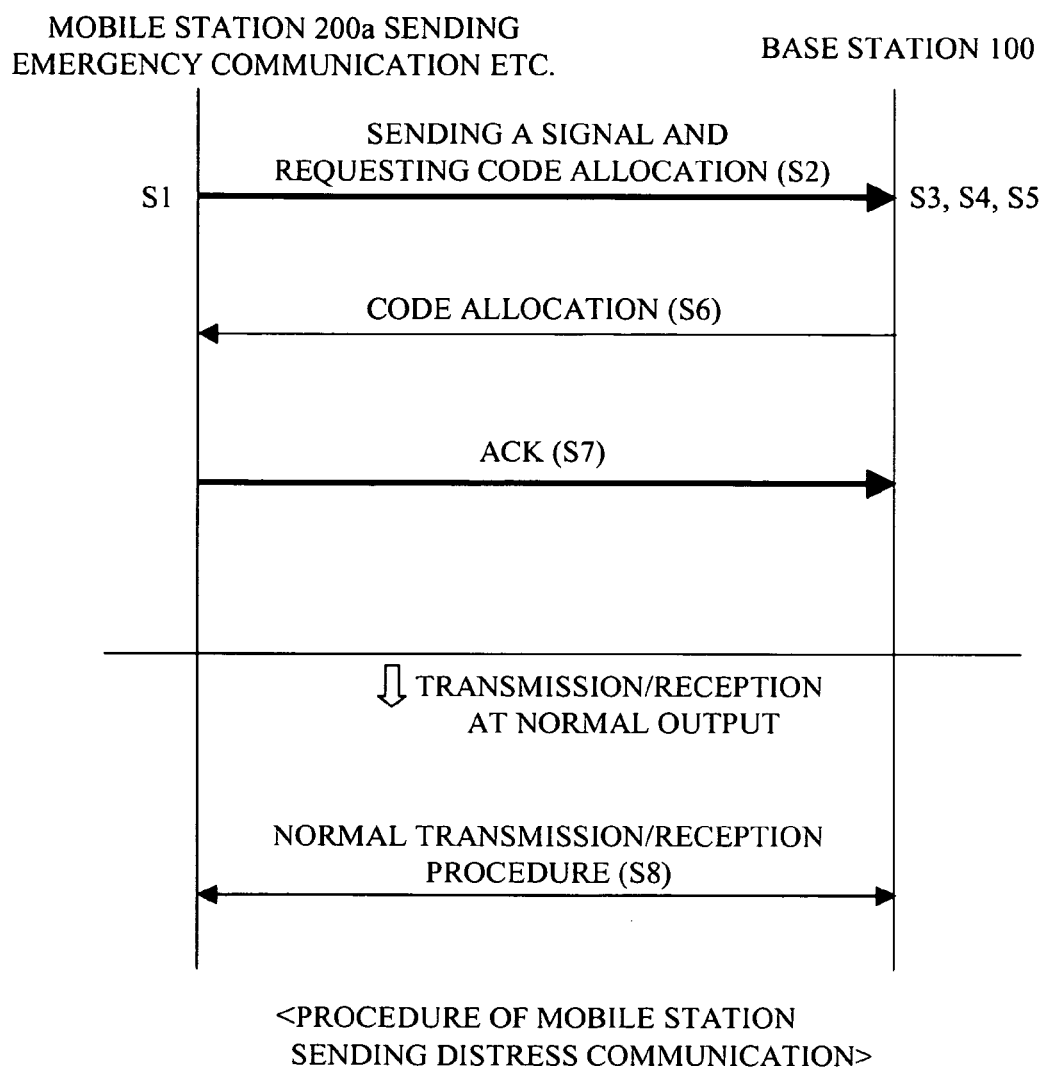
FIG. 4 shows a procedure under the assumption of the case of a mobile station sending distress communication.
Figure 5:
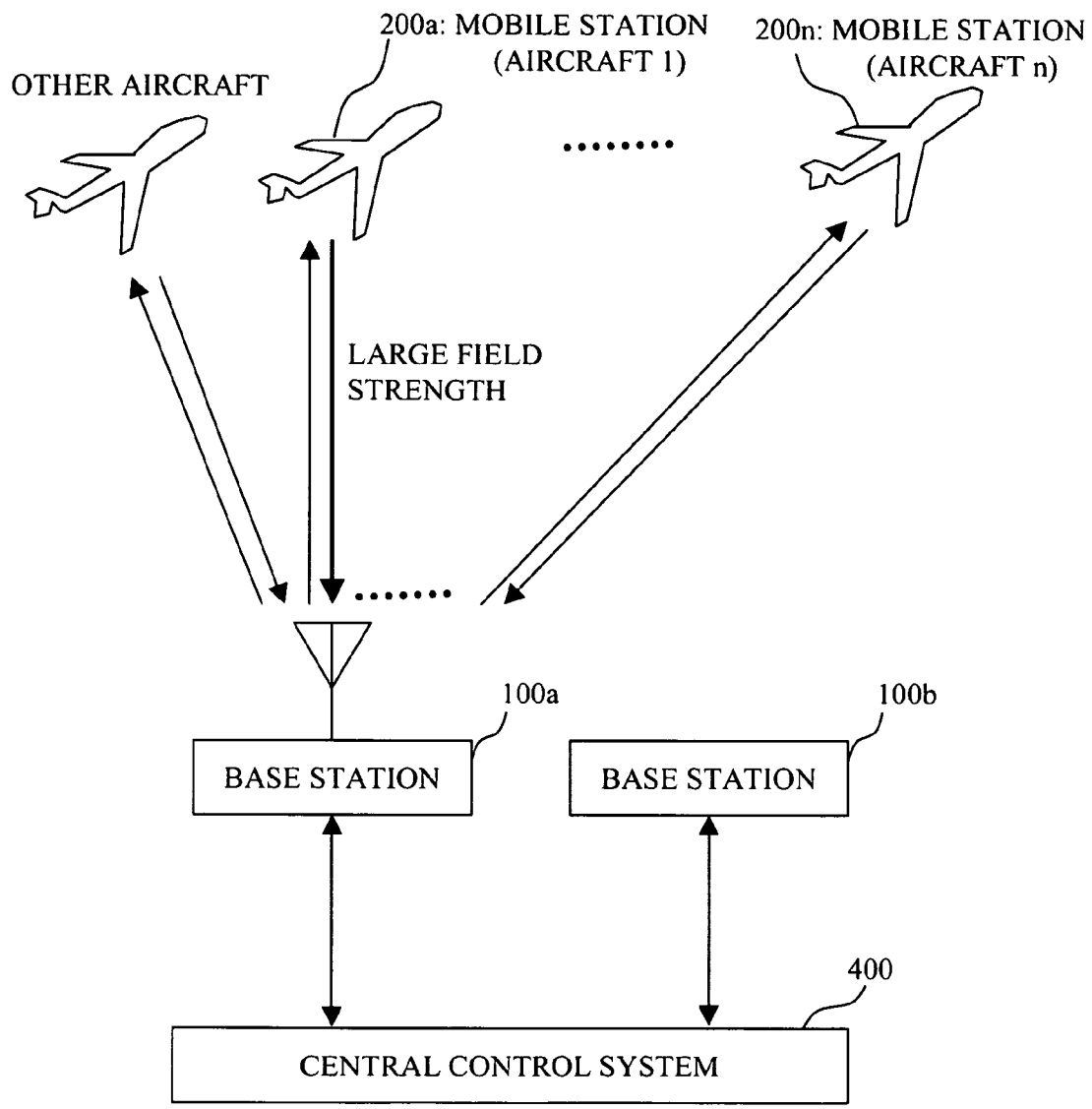
FIG. 5 shows a whole structure of communication system where a plurality of mobile stations send communication for emergency situation.
Figure 6:
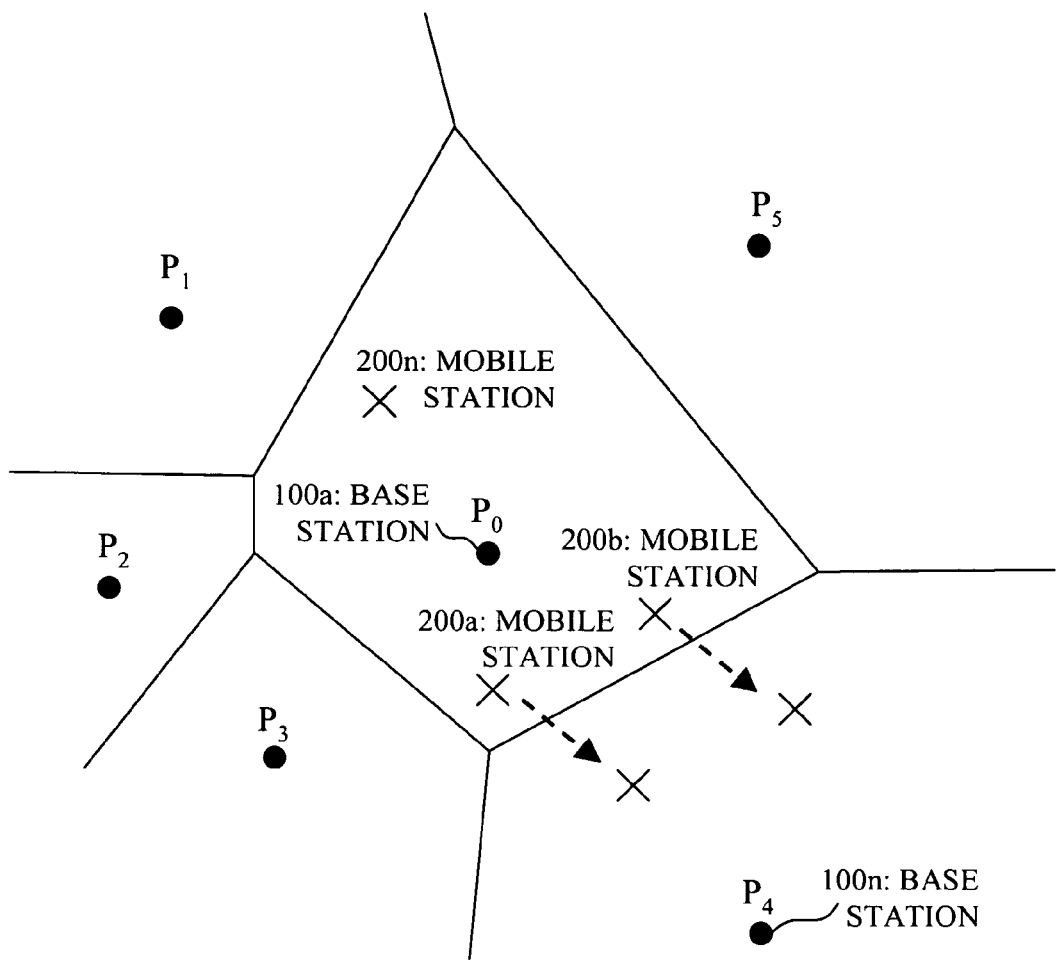
FIG. 6 is a Voronoi Diagram where $P_0$ to $P_5$ are generatrices.
Figure 7:
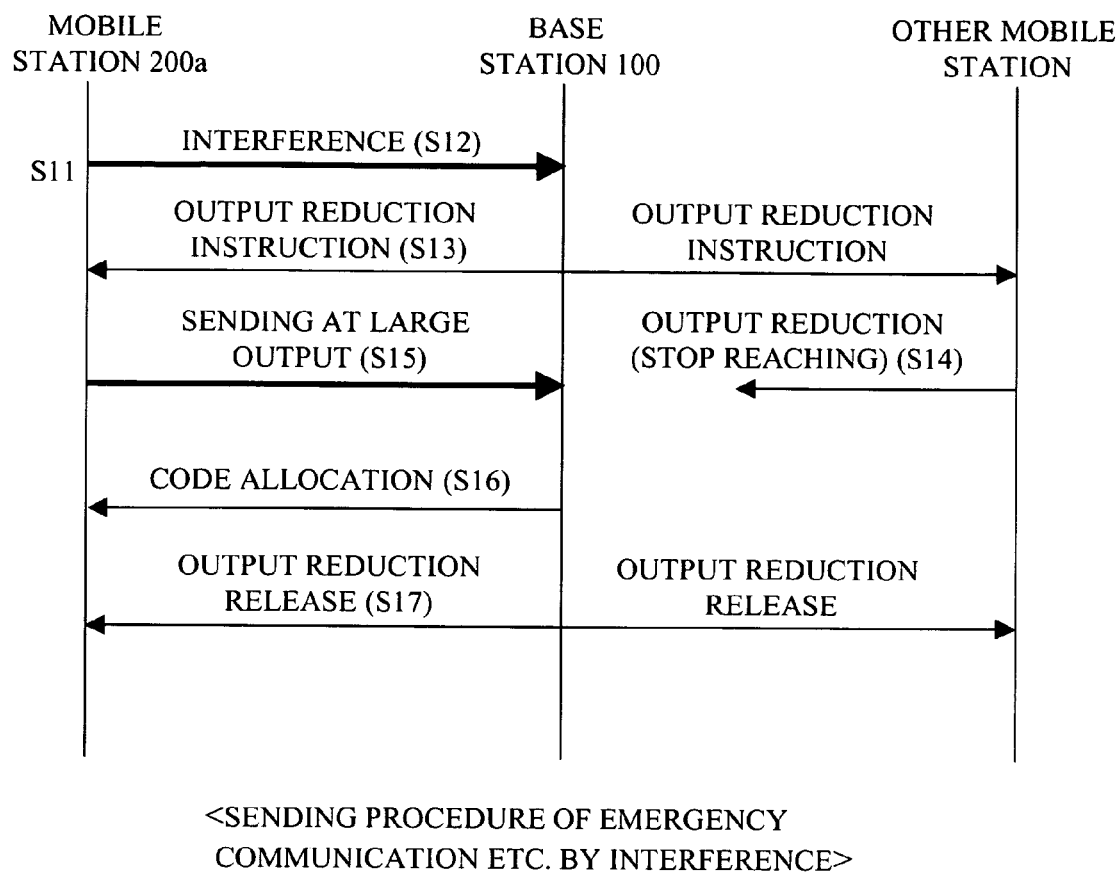
FIG. 7 shows sending procedure of communication for emergency situation by interfering.
Figure 8:
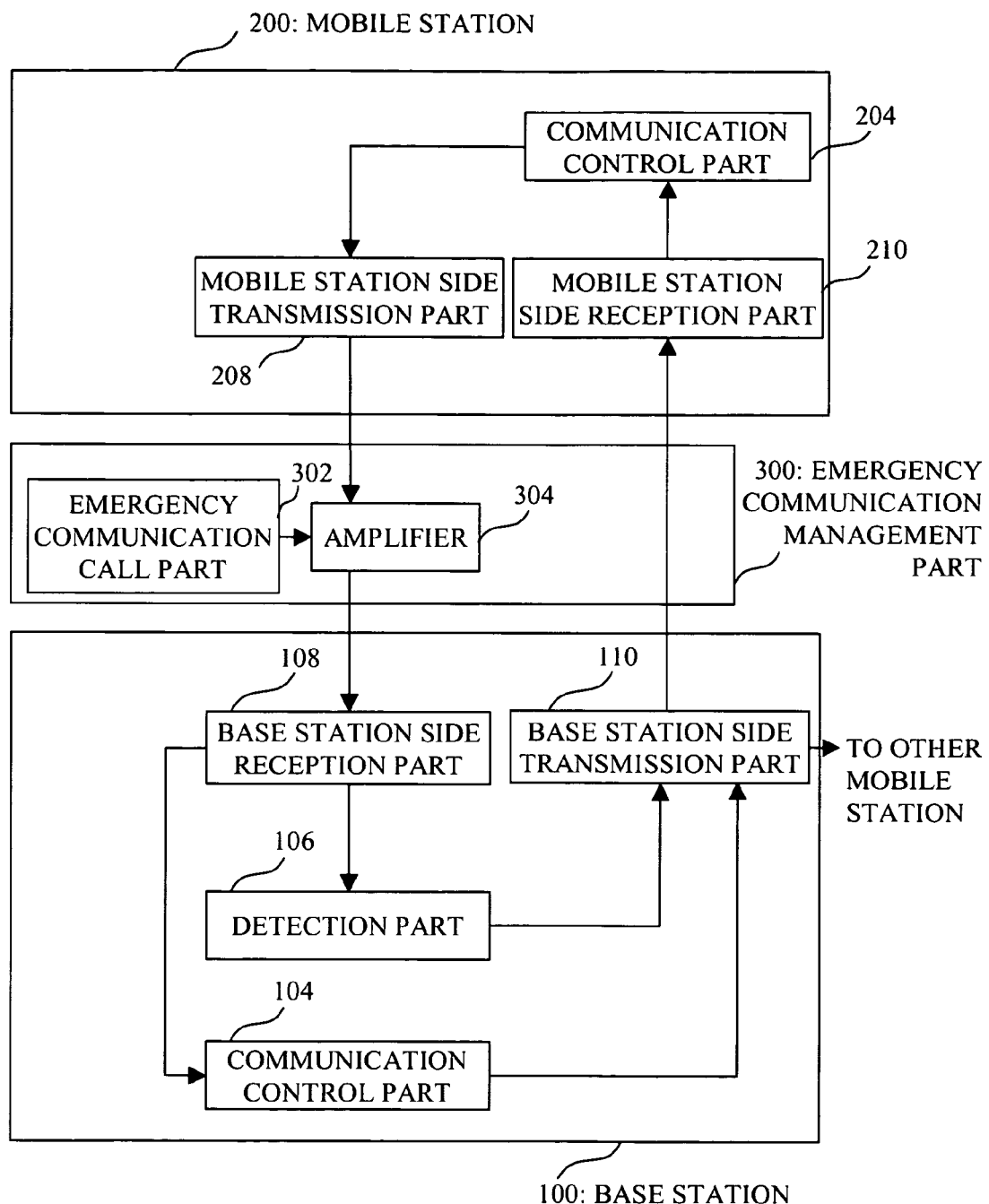
FIG. 8 shows another internal configuration of a base station and a mobile station.
Figure 9:
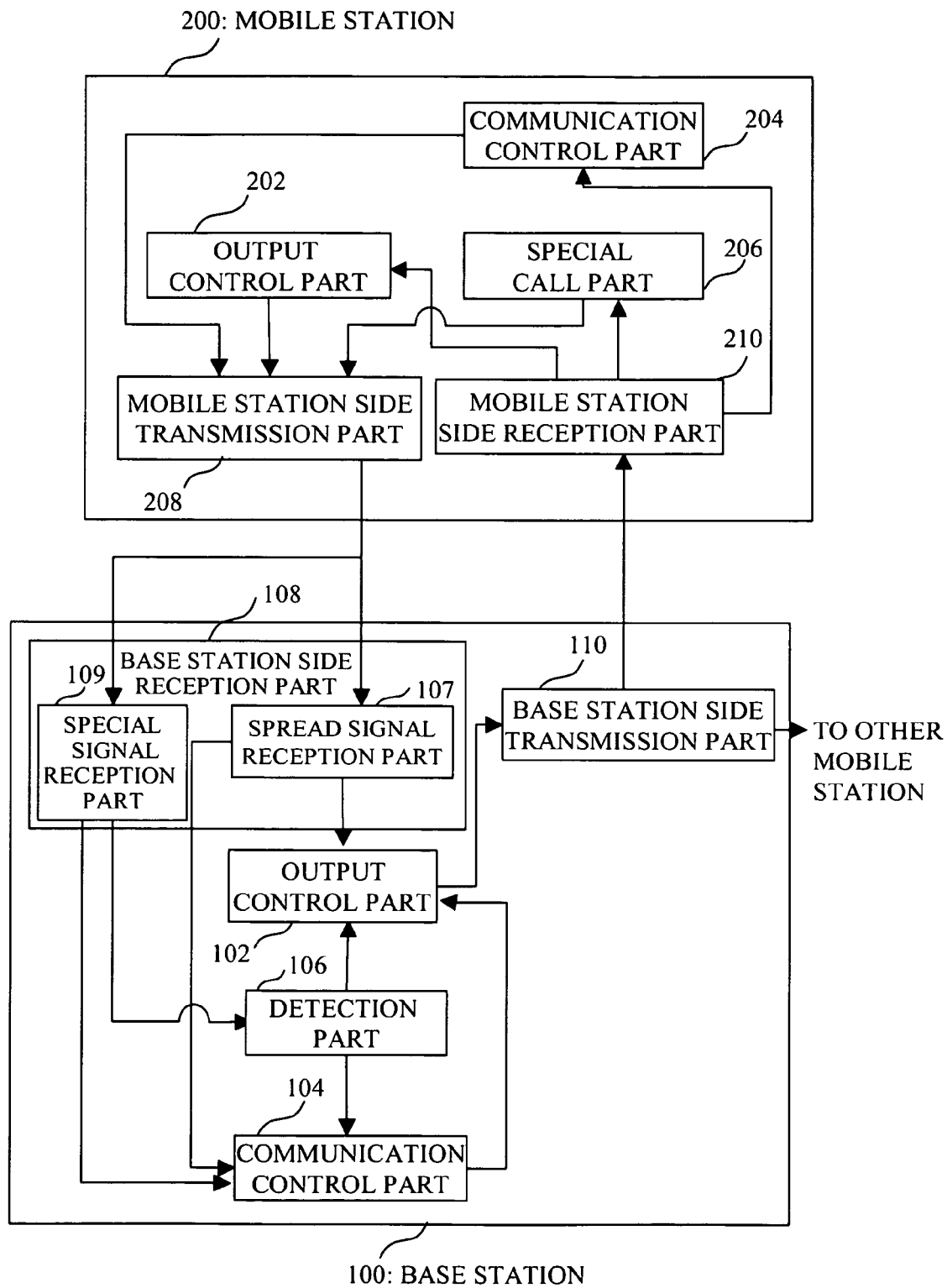
FIG. 9 shows an internal configuration of a base station and a mobile station.
Figure 10:
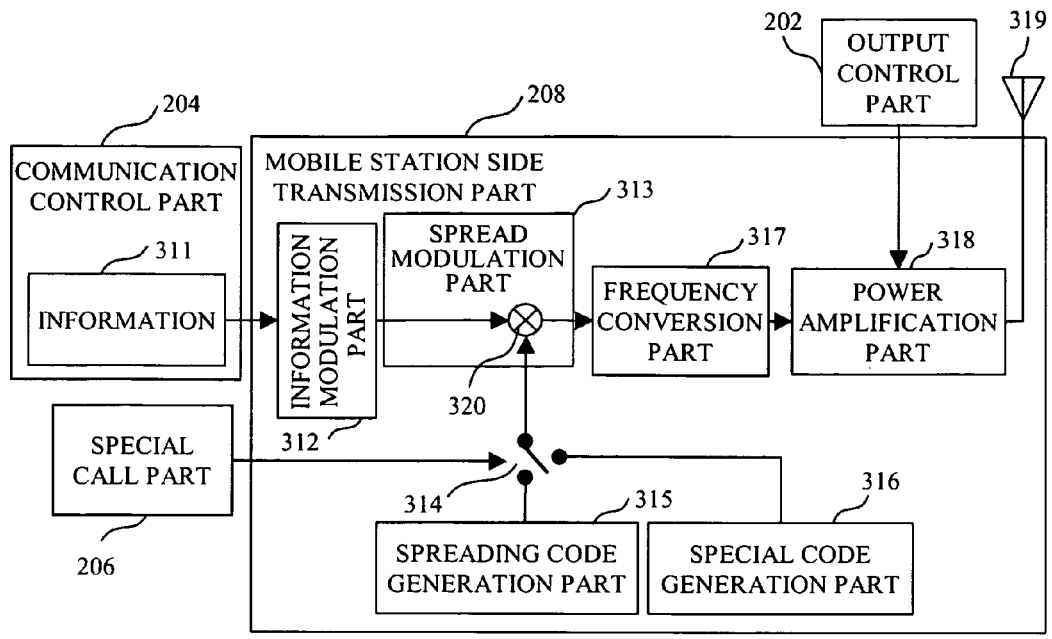
FIG. 10 shows an internal configuration of a mobile station side transmission part of a mobile station.
Figure 11:
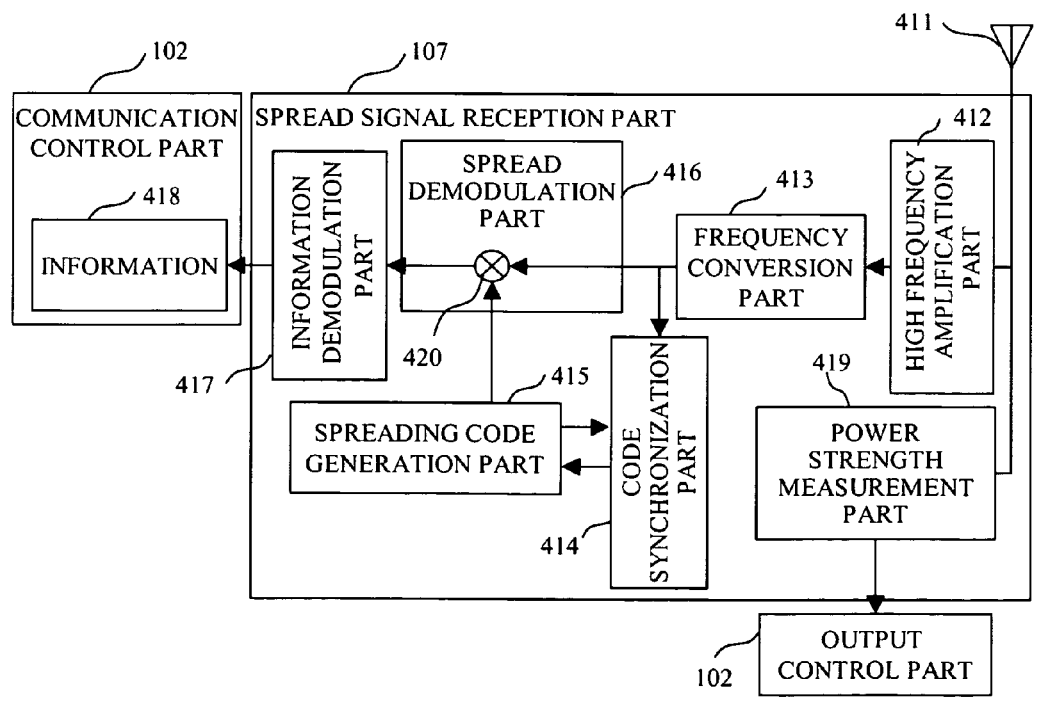
FIG. 11 shows an internal configuration of a spread signal reception part of a base station.
Figure 12:
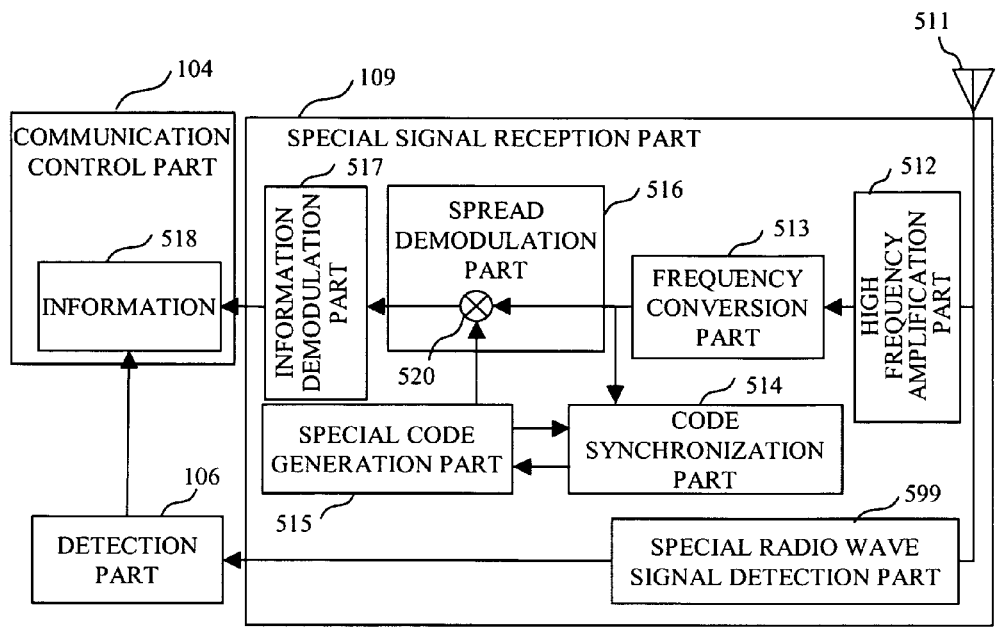
FIG. 12 shows an internal configuration of a special signal reception part of a base station.
Figure 13:
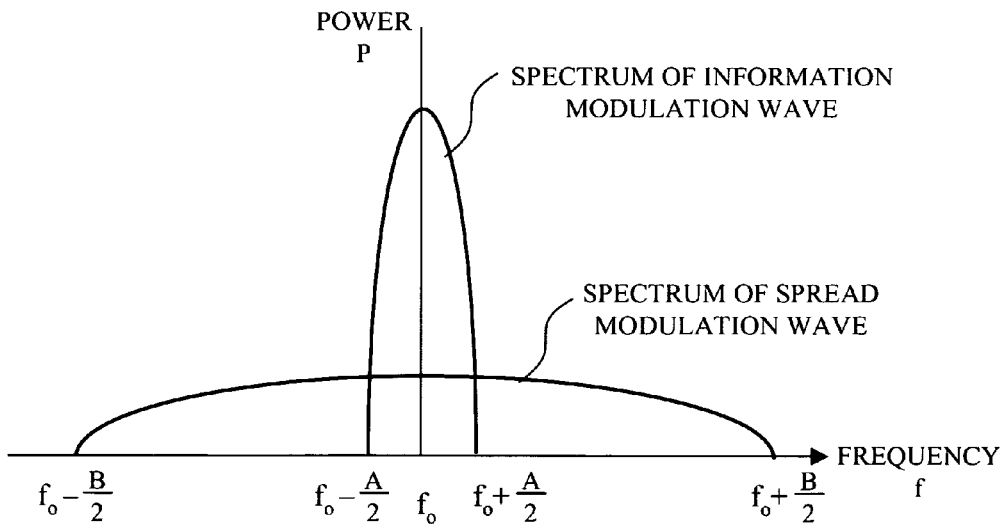
FIG. 13 shows a principle of spread modulation.
Figure 14:
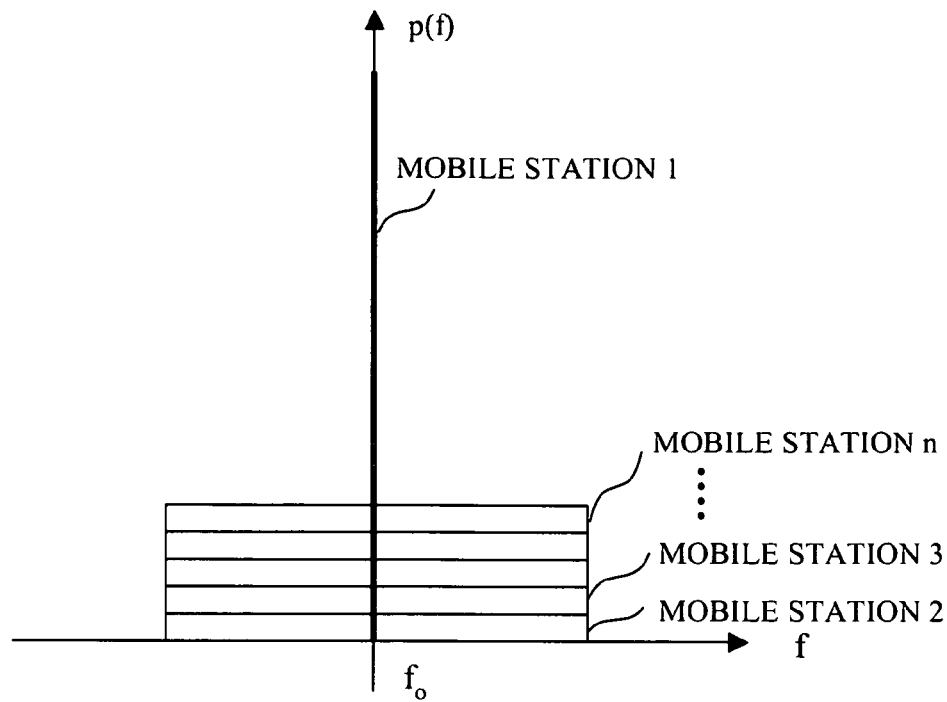
FIG. 14 shows superimposition of DS-CDMA and a single frequency wave.
Figure 15:
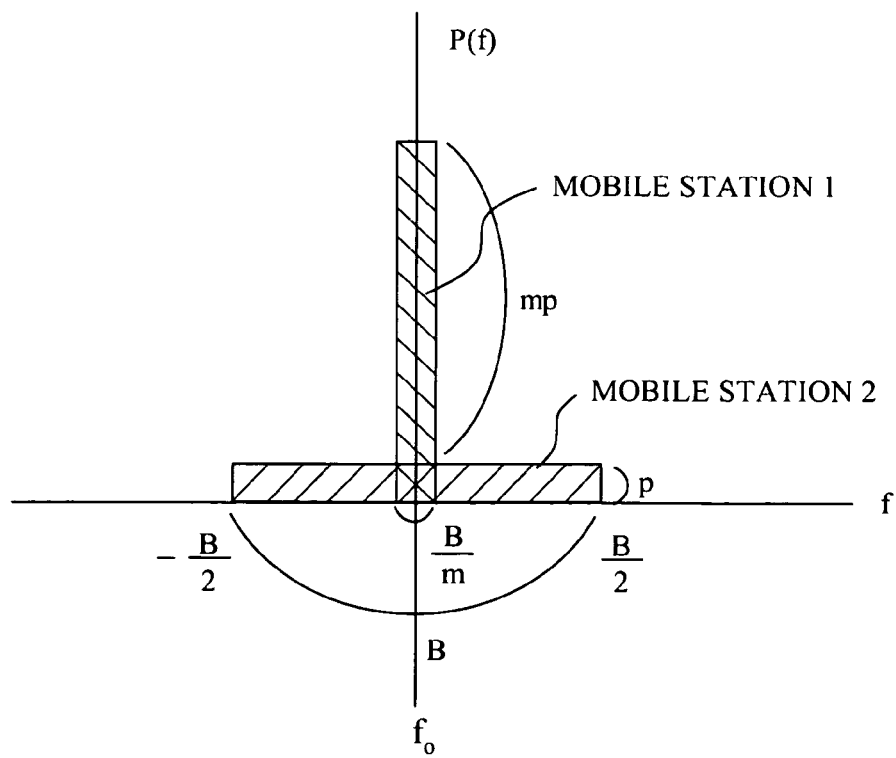
FIG. 15 illustrates equivalent outputs.
Figure 16A:
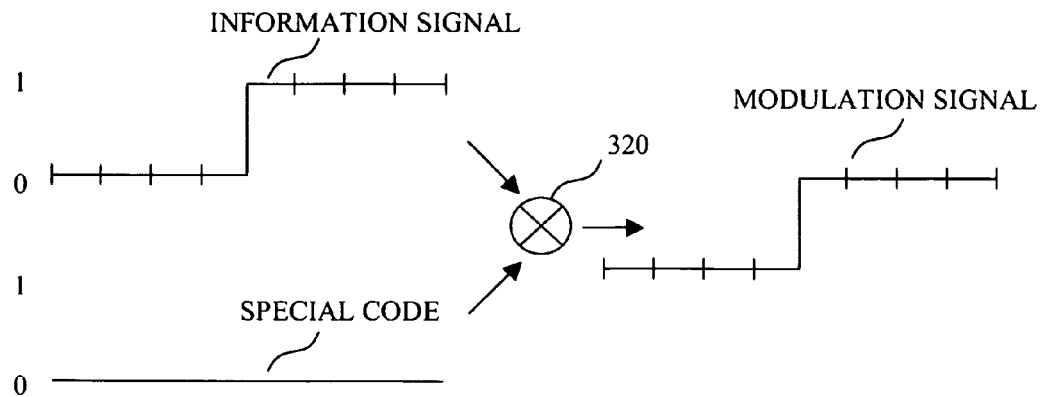
FIG. 16 shows a special code, a spreading code, an information signal, and a spread modulation signal.
Figure 16B:
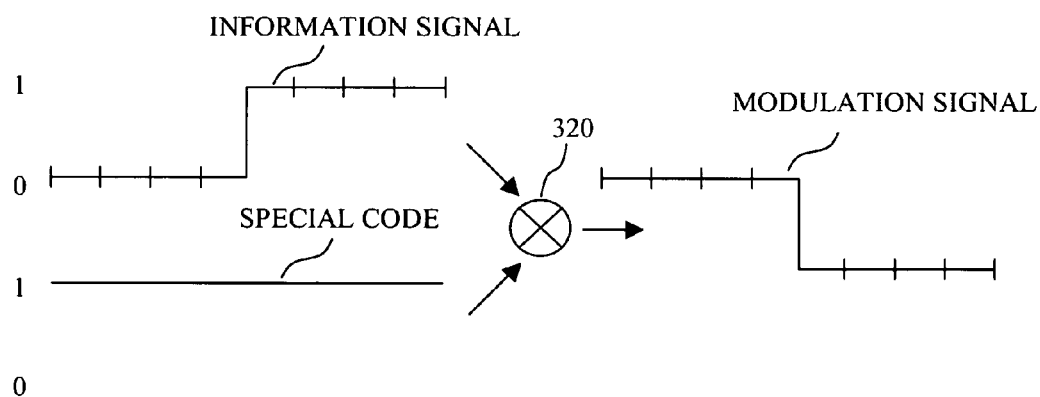
Figure 16C:
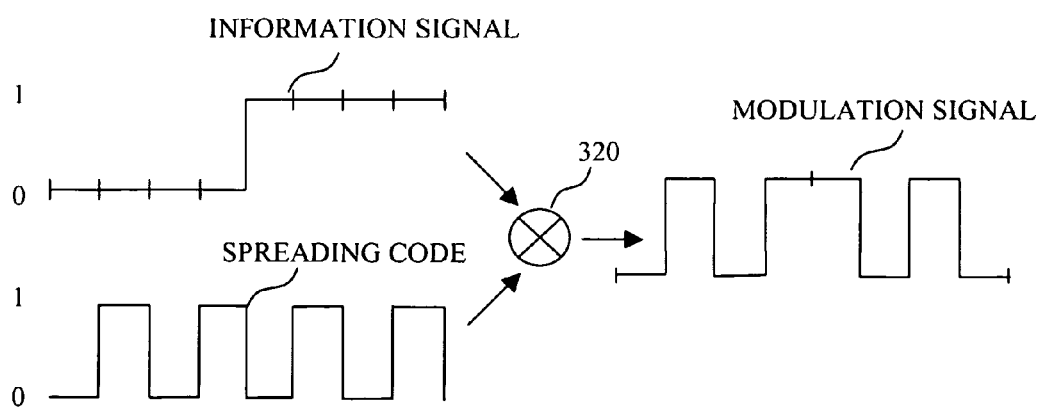
Figure 17A:
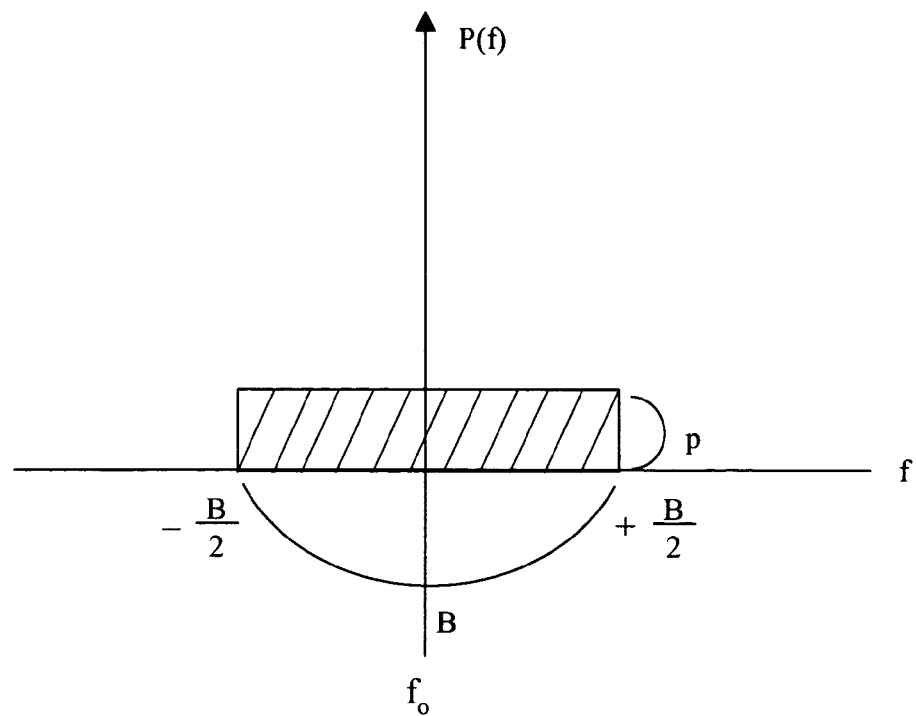
FIG. 17 shows a relation between an occupied bandwidth B and power spectrum density p(f)
Figure 17B:
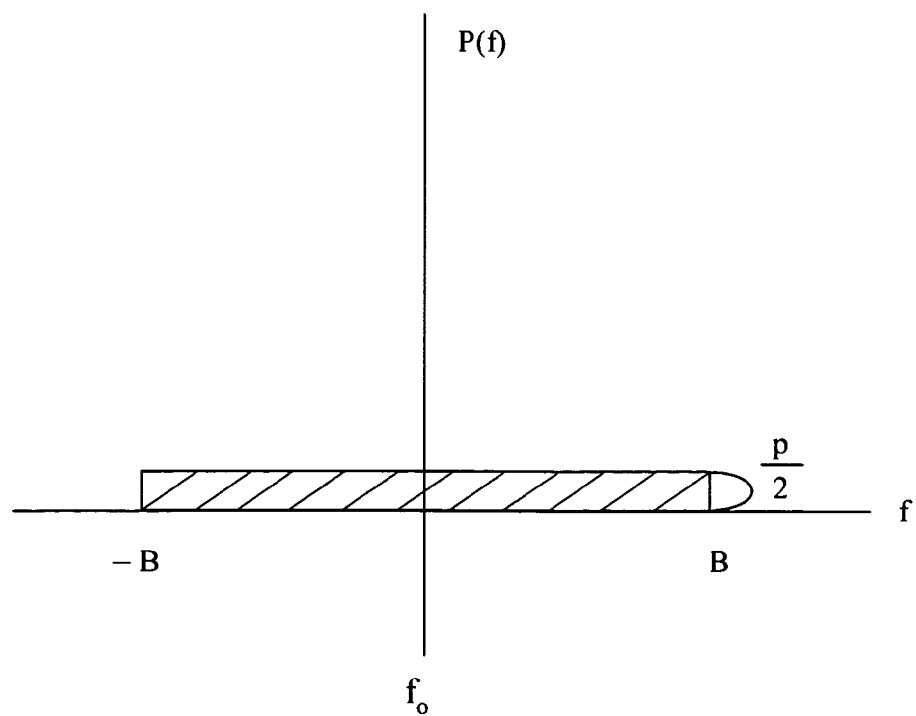
Figure 18:
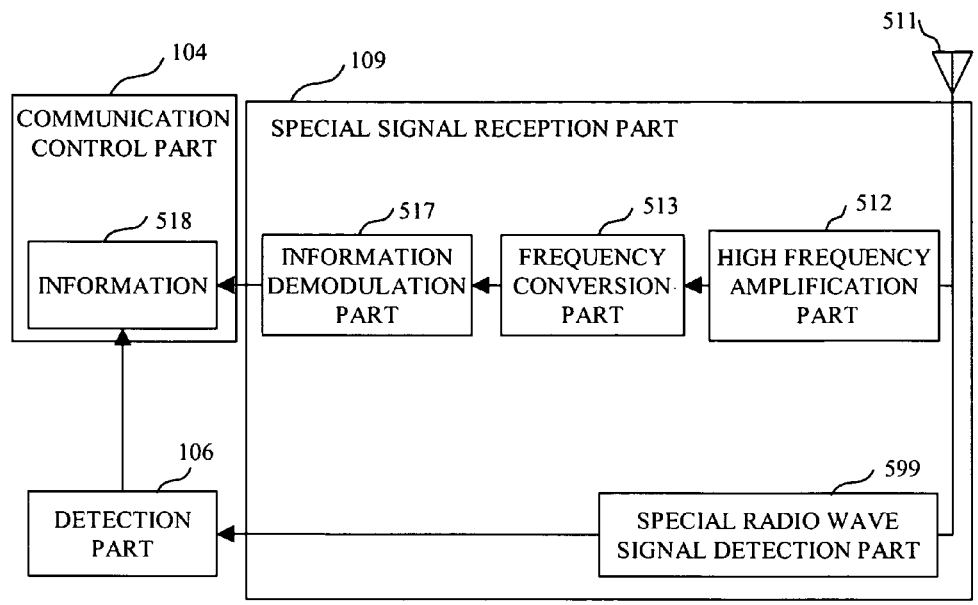
FIG. 18 shows an internal configuration of a special signal reception part of a base station.
Figure 19:
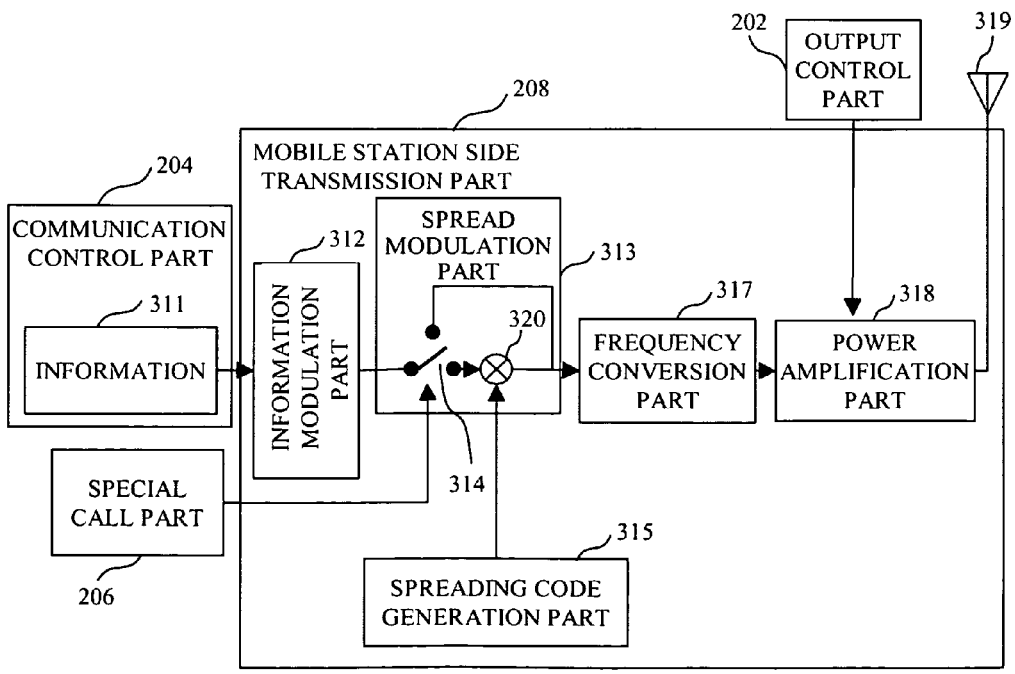
FIG. 19 shows an internal configuration of a mobile station side transmission part of a mobile station.
Figure 20:
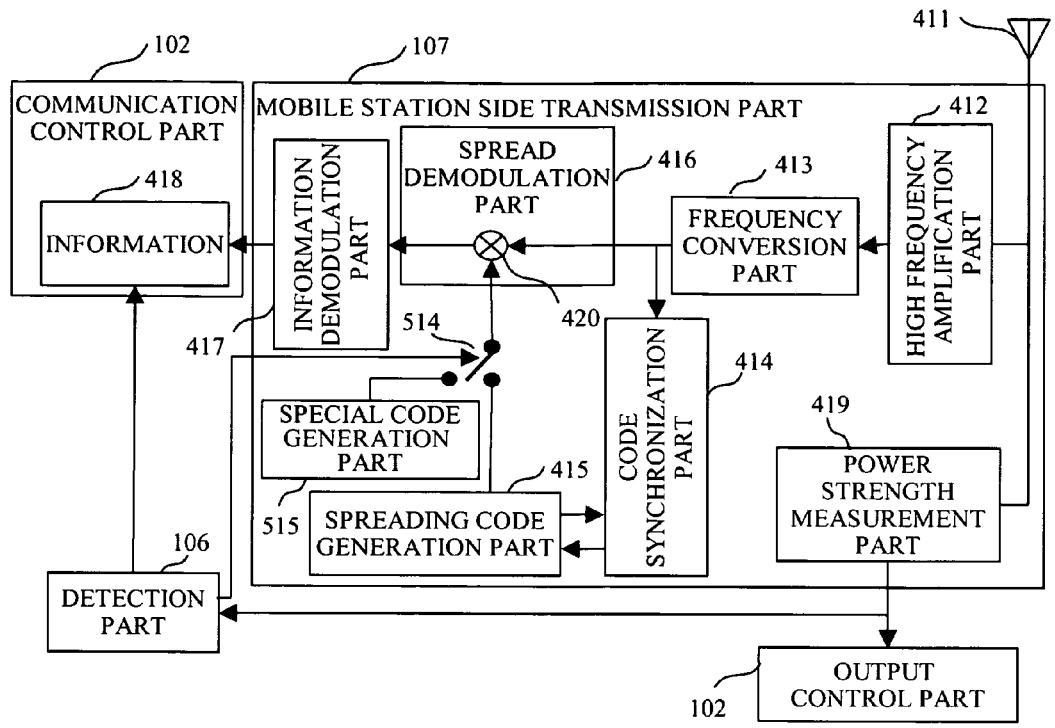
FIG. 20 shows an internal configuration of a base station side reception part of a base station.
Figure 21:
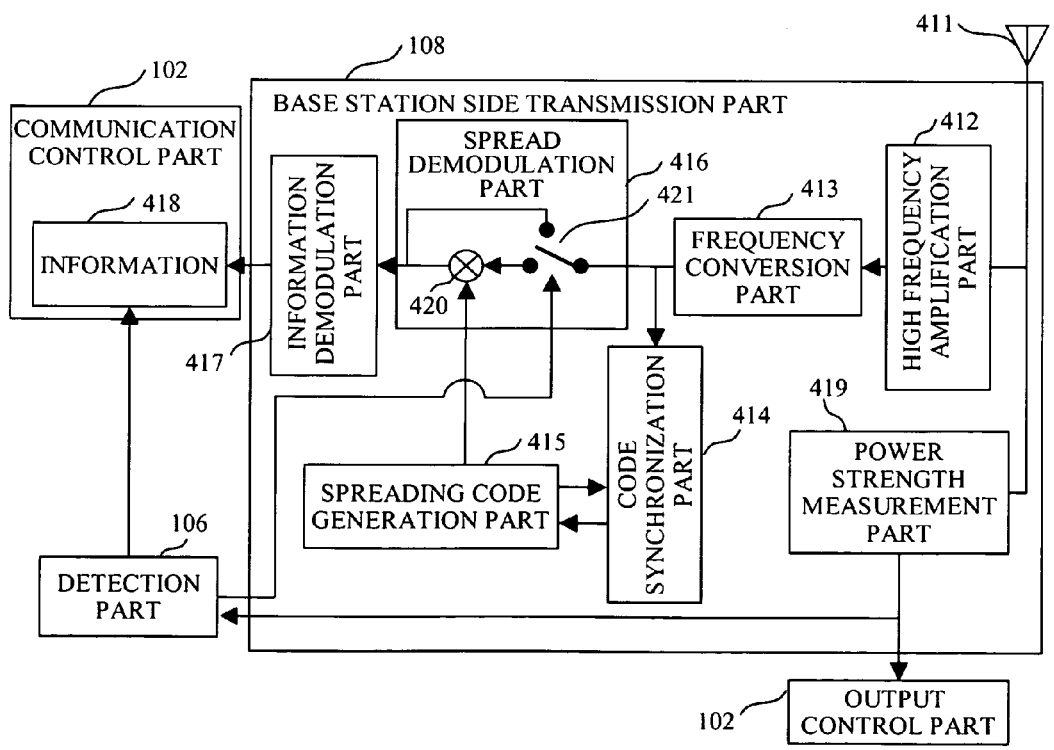
FIG. 21 shows an internal configuration of a base station side reception part of a base station.
Figure 22:
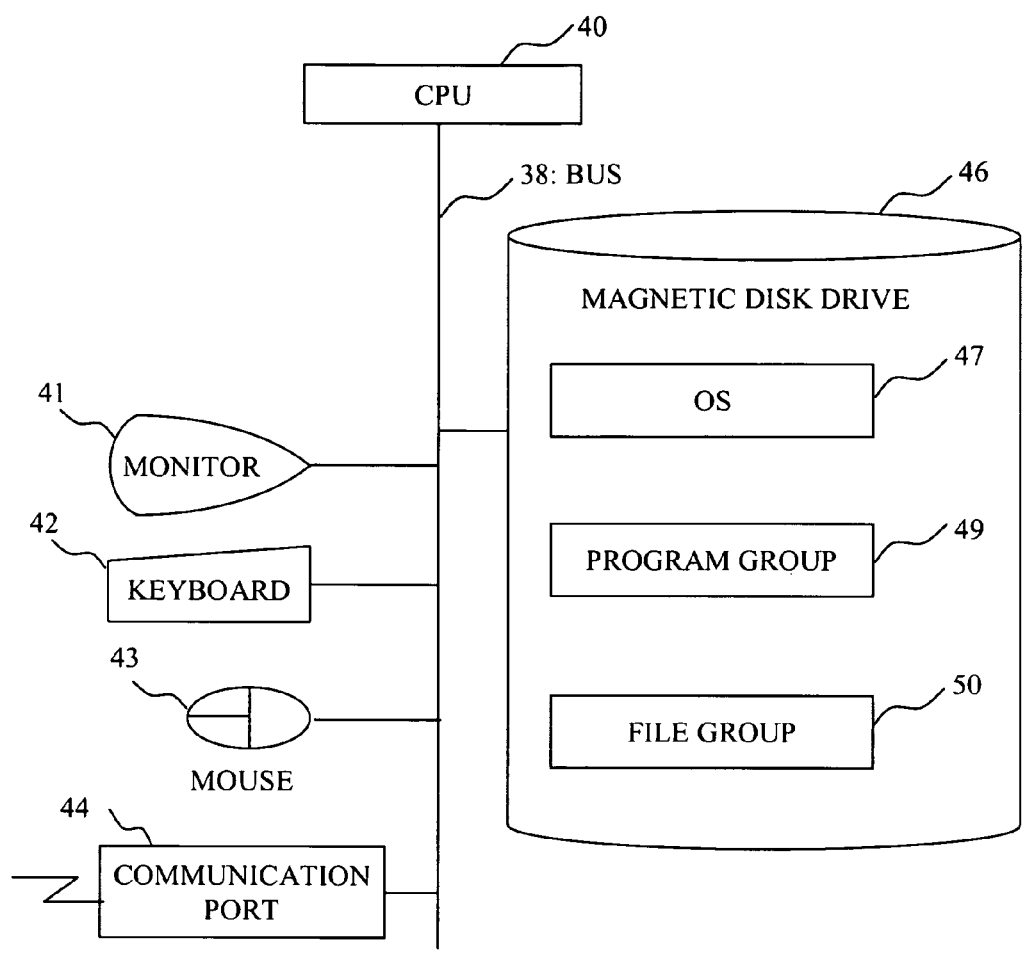
FIG. 22 shows a basic configuration of a computer of a base station and a mobile station.
Figure 23:
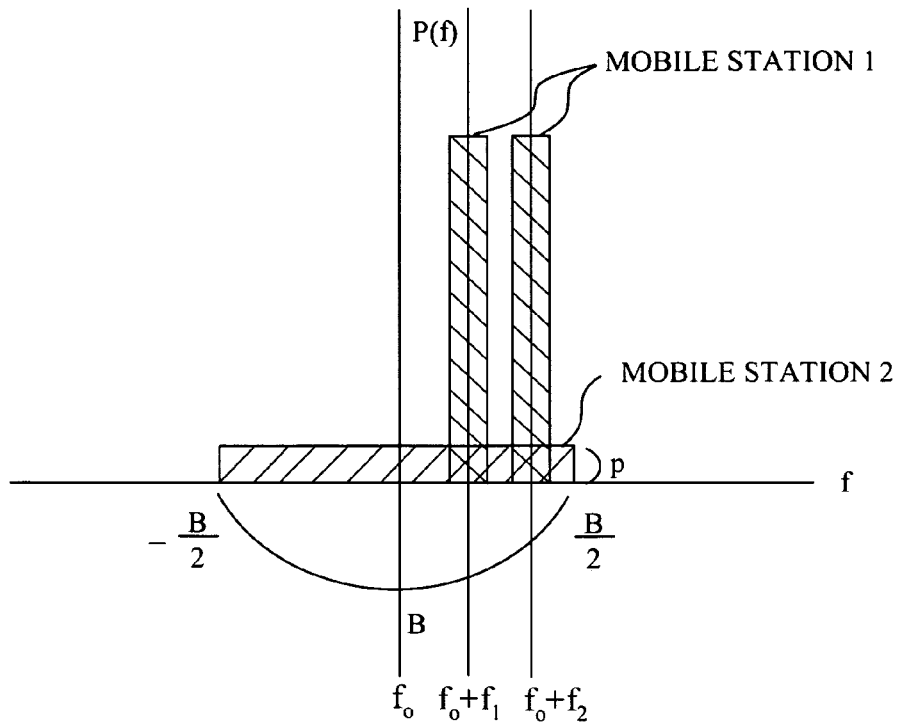
FIG. 23 shows an example of application.
Figure 24:
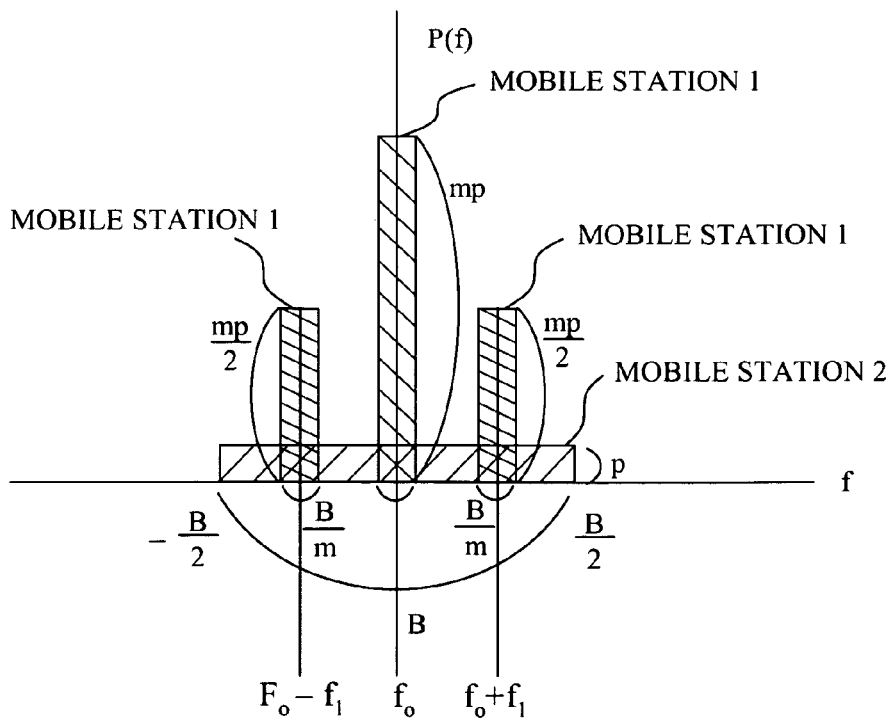
FIG. 24 shows an example of application.

DESCRIPTION OF THE REFERENCE NUMERALS 38 bus, 40 CPU, 41 monitor, 42 keyboard, 43 mouse, 44 communication port, 46 magnetic disk drive, 47OS, 49 program group, 50 file group, 100, 100a, 100b base stations, 102, 202 output control parts, 104, 204 communication control parts, 106 detection part, 107 spread signal reception part, 108 base station side reception part, 109 special signal reception part, 110 base station side transmission part, 200, 200a, 200*b*, 200*c*, 200*n* mobile stations, 206, 302 special call parts, 208 mobile station side transmission part, 210 mobile station side reception part, 300 emergency communication management part, 304 amplifier, 316 special code generation part.

The invention claimed is:

1. A mobile station of which communicates with a base station by using a direct sequence system, comprising:
    a special call part configured to request initiation of a special call;
    a mobile station side transmission part configured to, in response to a request from the special call part, generate a special radio wave signal of high power spectrum density and transmit it to the base station; and
    a spread modulation part configured to perform spread modulation of an information signal, wherein
    the mobile station side transmission part generates the special radio wave signal to be of high power spectrum density by bypassing the spread modulation part.

2. A mobile station which communicates with a base station by using a direct sequence system, comprising:
    a special call part configured to request initiation of a special call; and
    a mobile station side transmission part configured to, in response to a request from the special call part, generate a special radio wave signal of high power spectrum density and transmit it to the base station, wherein
    the mobile station side transmission part includes a special code generation part to generate a special code of a direct-current component, and a spread modulation part to perform spread modulation of an information signal by selectively using the special code generated by the special code generation part or a spreading code having a low correlation with a direct-current component depending on whether or not the special radio wave signal is to be generated, and
    the mobile station side transmission part generates the special radio wave signal of high power spectrum density by performing spread modulation of the information signal by using the special code of a direct-current component.

3. The mobile station of claim 1 further including a communication control part to restrict a bit rate of the information signal to be low when the mobile station side transmission part generates the special radio wave signal, in order to increase power spectrum density of the special radio wave signal by restricting the bit rate to be low.

4. The mobile station of claim 1, wherein
    the mobile station side transmission part performs communication by using the special radio wave signal until a session with the base station is established.

5. A mobile station which communicates with a base station by using a direct sequence system, comprising:
    a special call part configured to request initiation of a special call; and
    a mobile station side transmission part configured to, in response to the request from the special call part, switch from a mode of generating a normal spread modulation signal for the direct sequence system to a mode of generating a special radio wave signal of higher power spectrum density than the normal spread modulation signal, and transmit the special radio wave signal to the base station, wherein
    the mobile station side transmission part generates the special radio wave signal of same power as power used in generating the normal spread modulation signal for the direct sequence system, and of a narrower band than a band used in generating the normal spread modulation signal for the direct sequence system.

6. A communication control method performed by a mobile station side to communicate with a base station by using a direct sequence system, comprising:
    requesting initiation of a special call; and
    in response to the request for initiation of the special call, switching from a mode of generating a normal spread modulation signal for the direct sequence system to a mode of generating a special radio wave signal of higher power spectrum density than the normal spread modulation signal, and transmitting the special radio wave signal to the base station, wherein
    the special radio wave signal is generated of same power as power used in generating the normal spread modulation signal for the direct sequence system, and of a narrower band than a band used in generating the normal spread modulation signal for the direct sequence system.

7. A base station which communicates with a plurality of mobile stations by using a direct sequence system, comprising:
    a base station side reception part configured to receive a normal spread modulation signal used in the direct sequence system and a special radio wave signal of high power spectrum density from the plurality of mobile stations, the special radio wave signal being generated of same power as power used in generating the normal spread modulation signal for the direct sequence system, and of a narrower band than a band used in generating the normal spread modulation signal for the direct sequence system;
    a detection part configured to detect whether the base station side reception part received the special radio wave signal, and switch modes of extracting information in response to the detection; and
    a base station side transmission part configured to transmit an assignment signal for assigning a channel to a mobile station which had transmitted the special radio wave signal detected by the detection part.

8. A communication system where a base station and a plurality of mobile stations communicate using a direct sequence system, comprising:
    the plurality of mobile stations, each including
        a special call part configured to request initiation of a special call, and
        a mobile station side transmission part configured to, in response to a request from the special call part, switch from a mode of generating a normal spread modulation signal for the direct sequence system to a mode of generating a special radio wave signal of higher power spectrum density than the normal spread modulation signal, and transmit the special radio wave signal to the base station, wherein the mobile station side transmission part generates the special radio wave signal of same power as power used in generating the normal spread modulation signal for the direct sequence system, and of a narrower band than a band used in generating the normal spread modulation signal for the direct sequence system; and
    the base station including:
        a base station side reception part configured to receive the special radio wave signal of high power spectrum density from the plurality of mobile stations,
        a detection part configured to detect whether the base station side reception part received the special radio wave signal, and a base station side transmission part configured to transmit an assignment signal for assigning a channel to a mobile station which had transmitted the special radio wave signal detected by the detection part.

9. A computer-readable medium on which is embodied a communication control program having computer executable instructions for causing a mobile station side to communicate with a base station by using a direct sequence system, comprising instructions for:
   requesting initiation of a special call; and
   in response to the request for initiation of the special call, switching from a mode of generating a normal spread modulation signal for the direct sequence system to a mode of generating a special radio wave signal of higher power spectrum density than the normal spread modulation signal, and transmitting the special radio wave signal into the base station, wherein
   the special radio wave signal is generated of same power as power used in generating the normal spread modulation signal for the direct sequence system, and of a narrower band than a band used in generating the normal spread modulation signal for the direct sequence system.

10. A computer-readable medium on which is embodied a communication control program having computer executable instructions for causing a base station side to communicate with a plurality of mobile stations by using a direct sequence system, comprising instructions for:
    receiving a normal spread modulation signal used in the direct sequence system and a special radio wave signal of high power spectrum density from the plurality of mobile stations, the special radio wave signal being generated of same power as power used in generating the normal spread modulation signal for the direct sequence system, and of a narrower band than a band used in generating the normal spread modulation signal for the direct sequence system;
    detecting whether the special radio wave signal was received, and switching modes of extracting information in response to the detection; and
    transmitting an assignment signal for assigning a channel to a mobile station which had transmitted the special radio wave signal detected.

11. The mobile station of claim 2, further including a communication control part configured to restrict a bit rate of the information signal to be low when the mobile station side transmission part generates the special radio wave signal, in order to increase power spectrum density of the special radio wave signal by restricting the bit rate to be low.

12. The mobile station of claim 2, wherein
    the mobile station side transmission part performs communication by using the special radio wave signal until a session with the base station is established.

13. The mobile station of claim 5, wherein
    the mobile station side transmission part performs communication by using the special radio wave signal until a session with the base station is established.

* * * * *